United States Patent
Kosuge et al.

(10) Patent No.: US 7,048,994 B2
(45) Date of Patent: May 23, 2006

(54) LAMINATED POLYESTER FILM AND MAGNETIC RECORDING MEDIUM

(75) Inventors: Masahiko Kosuge, Tokyo (JP); Hirofumi Murooka, Tokyo (JP); Takeshi Ishida, Tokyo (JP)

(73) Assignee: Teijin Limited, Osaka (JP)

( * ) Notice: Subject to any disclaimer, the term of this patent is extended or adjusted under 35 U.S.C. 154(b) by 49 days.

(21) Appl. No.: 10/297,145

(22) PCT Filed: Feb. 20, 2002

(86) PCT No.: PCT/JP02/01468

§ 371 (c)(1),
(2), (4) Date: Dec. 3, 2002

(87) PCT Pub. No.: WO02/066250

PCT Pub. Date: Aug. 29, 2002

(65) Prior Publication Data

US 2003/0165700 A1    Sep. 4, 2003

(30) Foreign Application Priority Data

Feb. 23, 2001    (JP) ............................. 2001-047911

(51) Int. Cl.
*B32B 5/16*    (2006.01)
*B32B 27/36*    (2006.01)
*B32B 5/00*    (2006.01)

(52) U.S. Cl. ...................... 428/220; 428/323; 428/332; 428/480; 428/923; 428/924; 428/926

(58) Field of Classification Search ............... 428/64.2, 428/65.3, 65.5, 323, 332, 334, 411.1, 480, 428/900, 923, 924, 926, 220
See application file for complete search history.

(56) References Cited

U.S. PATENT DOCUMENTS

| 4,550,049 A | 10/1985 | Ono et al. |
| 5,922,164 A * | 7/1999 | Kimura et al. ............ 156/308.2 |
| 5,958,568 A | 9/1999 | Mizutani et al. |
| 6,670,030 B1 * | 12/2003 | Uchida et al. ............ 428/323 |

FOREIGN PATENT DOCUMENTS

| EP | 1 047 048 | 10/2000 |
| EP | 1 195 748 | 4/2002 |
| JP | 52-134706 | 11/1977 |
| JP | 54-147010 | 11/1979 |
| JP | 05-222171 | 8/1993 |
| JP | 7-285204 A | 10/1995 |
| JP | 08-030958 | 2/1996 |
| JP | 8-30958 A | 2/1996 |
| JP | 08-245811 | 9/1996 |
| JP | 8-245811 | 9/1996 |
| JP | 10-087806 | 4/1998 |
| JP | 10-87806 A | 4/1998 |
| JP | 1 101 0724 | 1/1999 |
| JP | 11-10724 A | 1/1999 |
| JP | 2000-015695 | 1/2000 |
| JP | 2000-108285 A | 4/2000 |
| JP | 2000-127322 A | 5/2000 |
| JP | 2000-141568 A | 5/2000 |
| JP | 2000-141570 A | 5/2000 |
| JP | 2001-294733 A | 10/2001 |
| WO | WO 0079524 | 12/2000 |

* cited by examiner

*Primary Examiner*—Sheeba Ahmed
(74) *Attorney, Agent, or Firm*—Sughrue Mion, PLLC

(57) ABSTRACT

A laminated polyester film excellent in blocking resistance and processing suitability and exhibiting excellent electromagnetic transducing characteristics and excellent travel durability, when processed into a magnetic recording medium, and an electromagnetic recording medium using the laminated polyester film as a base film, are provided.

This laminated polyester film comprises a polyester layer B containing a cyclic trimer in an amount of not more than 0.8 percent by weight, having a terminal carboxyl group concentration of not more than 35 eq/$10^6$ g and containing inactive particles B having an average particle diameter of 50 to 100 nm, and a polyester layer A laminated to one side of the polyester layer B and not containing inactive particles or containing inactive particles A having a smaller average particle diameter than that of the inactive particles B.

26 Claims, No Drawings

LAMINATED POLYESTER FILM AND MAGNETIC RECORDING MEDIUM

TECHNICAL FIELD

The present invention relates to a laminated polyester film and to a magnetic recording medium using the laminated polyester film as a base film. In more detail, the present invention relates to a laminated polyester film suitable as a base film for a magnetic recording medium excellent in electromagnetic transducing characteristics and travel durability, especially a ferromagnetic metal thin film type magnetic recording medium (for example, a digital video cassette tape or a data storage tape) for recording•regenerating digital signals, and to a magnetic recording medium using the laminated polyester film as a base film.

BACKGROUND ART

In recent years, the advances in the high density recording of magnetic recording media are remarkable. For example, ferromagnetic metal thin film type magnetic recording media having extremely high recording densities in comparison with conventional magnetic recording media have been developed and put to practical uses. In each of the ferromagnetic metal thin film type magnetic recording media, a ferromagnetic metal thin film has been formed on a non-magnetic recording support (base film) by a physical deposition method such as a vacuum deposition method or a sputtering method or by a plating method. As concrete ferromagnetic thin film type magnetic recording media, a Co-deposited tape has been proposed in JP-A 54-147010 (hereunder, JP-A means "Japanese Unexamined Patent Publication"), and a vertical magnetic recording medium comprising a Co—Cr alloy has been proposed in JP-A 52-134706.

Conventional magnetic recording media are magnetic recording media (coating type magnetic recording media) each obtained by mixing magnetic powder with an organic polymer binder and then coating the mixture on a non-magnetic recording support. The conventional coating type magnetic recording media have large magnetic layer thicknesses of not less than about 2 µm, and low recording densities, and are also long in recording wavelengths. On the other hand, the ferromagnetic metal thin film type magnetic recording media have very small magnetic layer (the metal thin film layer of the magnetic recording medium) thicknesses of not more than 0.2 µm, and high recording densities, and are also short in recording wavelengths.

By the way, the surface property of the magnetic layer of a magnetic recording medium is liable to be affected by the surface state of a base film, when the thickness of the magnetic layer is small. Hence, a ferromagnetic metal thin film type magnetic recording medium having a thin magnetic layer in comparison with a conventional coating type magnetic recording medium is liable to be affected by the surface state of a base film. Concretely, even a base film not having caused a problem in a conventional coating type magnetic recording medium develops the fine unevenness of the surface of a base film in a ferromagnetic metal thin film type magnetic recording medium as such on the surface of the magnetic layer, thereby often producing noises in recording•regenerating signals. Therefore, it is desirable that the surface of a base film used for a ferromagnetic metal thin film type magnetic recording medium is smooth as much as possible.

On the other hand, it is preferable that a base film has excellent slipperiness from the view points of handling properties such as a transporting property, a winding-up property and a winding-off property, in production processes (a film-producing process and a processing process). When the surface of the base film is too smooth, the mutual slipperiness of the film-film is deteriorated, or the surface of the base film is liable to be damaged. When the mutual slipperiness of the film-film is deteriorated or when the surface of the base film is liable to be damaged, the yield of the obtained product is lowered, and the enhancement of the production cost is further caused. Therefore, it is desirable that the surface of the base film is rough as much as possible from the viewpoint of the production cost.

In addition, in a process for producing a metal thin film type magnetic recording medium, a base film is usually subjected to an ion-bombarding treatment to enhance the adhesivity of the metal thin film to the base film. The ion-bombarding treatment is a treatment for activating the surface of the base film with ions, before the thin metal film is formed. When a metal thin film is formed on the surface of a base film, considerably high temperature heat is added to the base film. Hence, the back side of the base film is cooled so that the melting of the base film or the deterioration in the mechanical characteristics and the like of the base film are not caused, when the metal thin film is formed on the surface of the base film. As a method for cooling the back side of the base film is usually adopted a method for winding up the base film on a drum-like cooling member. At the time, both the ends of the base film are masked to prevent the formation of a metal thin film on the surface of the cooling member.

Thereby, portions on each of which a metal thin film has not been formed due to the masking exist in both the end portions of the laminate prepared by forming the metal thin film on the surface of the base film. The portions on which said metal thin films have not been formed continuously exist in the longitudinal direction of the base film, and the surfaces of the portions have been activated by the above-described ion bombarding treatment. When the above-described laminate is wound up in a roll-like shape, the portions on which said metal thin films have not been formed are brought into contact with the opposite side with large forces, and are liable to cause a blocking phenomenon, further because the surfaces of the portions have been activated. When a metal thin film type magnetic recording medium is produced, a metal thin film is vapor-deposited, and, if necessary, processing processes for disposing a back coat layer and a top coat layer are then applied. When the above-described blocking phenomenon is caused, the breakage of a base film and the wrinkling of the base film are liable to be caused in the processing processes, thereby largely lowering the yield of the metal thin film type magnetic medium. Therefore, it is preferable that the surface of the base film is rough for the prevention of the blocking of the film in the process for producing the metal thin film type magnetic recording medium.

Thus, the surface of the base film is required to be smooth from the viewpoint of the electromagnetic transducing characteristics, while being required to be rough from the viewpoints of the handling property improvement, production cost reduction and blocking phenomenon prevention.

In order to satisfy such the conflicting requirements as described above has been proposed a laminated film (for example JP-B 1-26338 (hereunder, JP-B means "Japanese Examined Patent Publication")) comprising two layers, wherein one of layers is a layer (flat surface layer) whose surface is flat, while the other is a layer (rough surface layer),whose surface is rough. However, this laminated film has problems such as a problem that high projections on the surface of the rough surface layer are transferred to the surface of the flat surface layer and a problem that large particles added to the rough surface layer are pushed up from the inner portions of the laminated film to the flat surface layer to roughen the surface of the flat surface layer.

Additionally, as a method for smoothening the surface of the flat surface layer, it has been proposed to prevent the deterioration in the smoothness of the surface with the residues (fine particles) of a catalyst. Concretely has been proposed a laminated film (for example, JP-A 12-15695) using as the raw material of a flat surface layer a polyester which uses a germanium compound as a polymerization catalyst and contains the germanium and phosphorus in specific amounts. However, this laminated film has a problem that foreign matters such as projections dropped from the rough surface layer or oligomers bled out from the rough surface layer are adhered to the flat surface layer to deteriorate the smoothness of the flat surface layer, in a process for producing a base film or in a process for processing the above-described metal thin film.

DISCLOSURE OF THE INVENTION

The object of the present invention is to provide a laminated polyester film which solves the problems of the laminated films by the above-described background art, is excellent in blocking resistance and in processing aptitude, and exhibits excellent electromagnetic transducing characteristics and excellent travel durability, when processed into a magnetic recording medium, and to provide a magnetic recording medium using the laminated polyester film as a base film.

The further other objects and advantages of the present invention will be clarified from the following explanations.

According to the present invention, the above-described objects and advantages of the present invention are achieved, first, by a laminated polyester film comprising a polyester layer A and a polyester layer B laminated to one side of the polyester layer A, wherein the polyester layer B contains a cyclic trimer in an amount of not more than 0.8 percent by weight based on the weight of the polyester layer B, has a terminal carboxyl group concentration of not more than 35 eq/$10^6$ g in the polyester for forming the polyester layer B, and contains inactive particles B having an average particle diameter of 50 to 1000 nm in an amount of 0.001 to 1 percent by weight based on the weight of the polyester layer B and wherein the polyester layer A does not contain inactive particles or contains inactive particles A having a smaller average particle diameter than the average particle diameter of the inactive particles B.

According to the present invention, the above-described objects and advantages of the present invention are achieved, second, by a magnetic recording medium comprising the laminated polyester film and a magnetic layer on the surface of the polyester layer A of said laminated polyester film.

PREFERABLE MODE FOR CARRYING OUT THE INVENTION

Hereinafter, the present invention will be explained in detail. First, the laminated polyester film will be explained.

<Polyester Layer A>

In the present invention, an aromatic polyester is especially preferable as the polyester for forming the polyester layer A. The aromatic polyester includes poly(ethylene terephthalate), poly(ethylene isophthalate), poly(tetramethylene terephthalate), poly(-1,4-cyclohexylenedimethylene terephthalate), and poly(ethylene-2,6-naphthalene dicarboxylate). Among the aromatic polyesters, poly(ethylene terephthalate) and poly(ethylene-2,6-naphthalene dicarboxylate) are preferable.

These polyesters may be homopolyesters or copolyesters. In the case of the copolyesters, the copolymerization component of, for example, poly(ethylene terephthalate) or poly(ethylene-2,6-naphthalene dicarboxylate) includes other diol components such as diethylene glycol, propylene glycol, tetramethylene glycol, haxamethylene glycol, neopentyl glycol, polyethylene glycol, 1,4-cyclohexanedimethanol, and p-xylylene glycol, other dicarboxylic acid components such as adipic acid, sebacic acid, phthalic acid, isophthalic acid, terephthalic acid (but, in the case of poly(ethylene-2,6-naphthalene dicarboxylate)), 2,6-naphthalene dicarboxylic acid (but, in the case of poly(ethylene terephthalate)), and 5-sodium sulfoisophthalic acid, and hydroxycarboxylic acids such as p-hydroxyethoxybenzoic acid. The amount of the copolymerization component is preferably not more than 20 percent by mole, more preferably not more than 10 percent by mole, based on the total amount of the dicarboxylic acid component. A copolyester containing poly(ethylene terephthalate) or poly(ethylene-2, 6-naphthalene dicarboxylate) as a main component may be copolymerized with a tri-functional or more-functional compound such as trimellitic acid, pyromellitic acid or pentaerythritol. The amount of the copolymerized compound is preferably an amount giving a substantially linear polymer, for example, an amount of not more than 2 percent by mole based on the total amounts of the dicarboxylic acid component. It will be understood by persons skilled in the art that the copolymerization components can further similarly be applied to copolyesters not containing poly(ethylene terephthalate) or poly(ethylene-2,6-naphthalene dicarboxylate) as a main component.

The above-mentioned polyesters themselves are known, and can be produced by methods themselves known well. For example, poly(ethylene terephthalate) can be produced by a method (melt polymerization) comprising subjecting terephthalic acid and ethylene glycol to an esterification reaction or subjecting dimethyl terephthalate and ethylene glycol to an ester interchange reaction and then polycondensing the reaction product. Further, the polyester obtained by the above-described method (melt polymerization) may, if necessary, be subjected to a polymerization method (solid polymerization) in a solid state to produce the polymer having a larger polymerization degree.

In the present invention, the polyester for forming the polyester layer A preferably contains diethylene glycol (DEG) component in an amount ranged from 0.1 to 2.5 percent by weight based on the weight of the polyester layer A. The DEG is by-produced or added as a copolymerization component, in a process for producing the polyester. When the content of the DEG in the polyester layer A is lower than the lower limit, the productivity of the polyester is apt to be lowered. On the other hand, when the content of the DEG in the polyester layer exceeds the upper limit, the heat resistance of the base film is occasionally lowered to roughen the surface of the base film in a process for vapor-depositing a metal thin film. The preferable content of the DEG in the polyester layer A is ranged from 0.2 to 2.2 percent by weight, especially 0.3 to 2.0 percent by weight.

In the present invention, it is preferable that the polyester for forming the polyester layer A has a temperature obtained by subtracting a crystallization temperature (Tc) on the fall of temperature from the melted state of the polyester from the melting point (Tm) of the polyester, namely a crystallization parameter (hereinafter, sometimes referred to as Δ Tcm), in a range of 70 to 180° C. The Δ Tcm has a close relation to the smoothness of the polyester layer A. When the Δ Tcm exceeds the upper limit, the crystallization of the polyester rapidly proceeds on the production of a laminated polyester film, and the surface of the obtained polyester layer A is liable to be roughened. On the other hand, when the Δ Tcm is lower than the lower limit, the mechanical strength of the obtained laminated polyester film is liable to be lowered. A method for controlling the Δ Tcm of the polyester in the range of 70 to 180° C. includes a method which comprises using a titanium catalyst as a polymerization catalyst in a titanium element amount of 5 to 30 ppm based on the weight of the polyester layer A and further using an antimony compound as a polymerization catalyst in an antimony element amount of at most 5 ppm based on the weight of the polyester layer A. The other method for controlling the Δ Tcm of the polyester in the range of 70 to 180° C. includes a method which comprises controlling a preheating temperature just before the application of a stretching treatment to a range of the glass transition temperature (Tg) of the polyester to Tg+10° C., and further controlling the temperature of a heat-setting treatment after the stretching treatment to a range of Tg+60° C. to the melting point (Tm) of the polyester −20° C.

In the present invention, catalysts themselves known well may be used as catalysts for producing the polyester for forming the polyester layer A. An ester interchange catalyst on melt polymerization includes the oxide, chloride, carbonate or carboxylate of a metal such as manganese, calcium, magnesium or titanium. Among the metal compounds, the acetate (manganese acetate, calcium acetate, magnesium acetate or titanium acetate) of the metal such as manganese, calcium, magnesium or titanium is preferable as the ester interchange catalyst on the melt polymerization.

In addition, a polycondensation catalyst for producing the polyester for forming the polyester layer A includes an antimony compound, a titanium compound and a germanium compound.

The antimony compound used as the polymerization catalyst includes antimony trioxide, antimony pentaoxide and antimony acetate. The antimony element (Sb) amount of the antimony compound used as the polycondensation catalyst is preferably ranged from 10 to 250 ppm, especially preferably from 15 to 220 ppm, based on the weight of the polyester layer A. When the amount of Sb is less than the lower limit, it is difficult to sufficiently develop the effect as the polycondensation catalyst. On the other hand, when the amount of the Sb exceeds the upper limits, the antimony compound as the catalyst residue is apt to deposit in the polyester to roughen the surface of the polyester layer A.

The polyester layer A preferably contains antimony element (Sb) in an amount of 10 to 250 ppm based on the weight of the polyester layer A.

An organic titanium compound, especially an organic titanium compound described in JP-A 5-298670, is preferable as the titanium compound used as the polymerization catalyst, because of being easily dissolved in the polyester. In more detail, as the organic titanium compound used in the present invention are preferable the alkolate or organic acid salt of titanium, or the reaction product of a tetraalkyl titanate with an aromatic polybasic carboxylic acid or its acid anhydride, especially titanium tetrabutoxide, titanium isopropoxide, titanium oxalate, titanium acetate, titanium benzoate, titanium trimellitate or the reaction product of tetrabutyl titanate with trimellitic anhydride. The titanium element (Ti) amount of the titanium compound used as the polycondensation catalyst is preferably ranged from 3 to 25 ppm, especially from 5 to 20 ppm, based on the weight of the polyester layer A. When the amount of Ti is less than the lower limit, it is difficult to sufficiently develop the effect as the polycondensation catalyst. On the other hand, when the amount of Ti exceeds the upper limit, the thermal stability of the polyester is occasionally lowered.

The polyester layer A preferably contains titanium element (Ti) in an amount of 3 to 25 ppm based on the weight of the polyester layer A.

The germanium compound used as the polymerization catalyst includes a germanium compound described in Japanese Patent 2792068. In more detail, the germanium compound used as the polymerization catalyst includes (1) amorphous germanium oxide, (2) crystalline germanium oxide, (3) a solution prepared by dissolving germanium oxide in a glycol in the presence of an alkali metal, an alkaline earth metal or their compounds, and (4) a germanium oxide glycol solution prepared by dissolving germanium oxide in water, adding the obtained aqueous solution to a glycol and then distilling away the water. The germanium compound increases the amount of by-produced DEG in comparison with other polymerization catalysts, when the polyester is produced. In order to control the content of DEG in the polyester layer to not more than 2.5 percent by weight, it is therefore preferable to control the germanium element (Ge) amount of the germanium compound used as the polycondensation catalyst to not more than 10 ppm, especially not more than 5 ppm, based on the weight of the polyester layer A. Of course, it is preferable that the polyester for forming the polyester layer A does substantially not contain the germanium element (Ge), because high thermal stability can be given to the polyester layer A.

The polyester layer A preferably contains germanium element (Ge) in an amount of not more than 10 ppm based on the weight of the polyester layer A.

In the present invention, it is preferable that the polyester layer A contains a phosphorous compound. The phosphorous compound is added to enhance the thermal stability of the polyester for forming the polyester layer A, in a process for producing the polyester. The phosphorous compound used in the present invention includes phosphorous compounds themselves known well, especially preferably orthophosphoric acid, phosphorous acid, trimethyl phosphate, triethyl phosphate, and tri-n-butyl phosphate.

The polyester layer A may be a polyester layer substantially not containing inactive particles or a polyester layer containing the inactive particles A. Herein, the polyester layer substantially not containing the inactive particles means a polyester layer in which the residues of a catalyst used for producing the polyester are not deposited or a polyester layer in which inactive particles are not added to the polyester.

When used as the base film of a magnetic recording medium, the laminated polyester film whose polyester layer. A does substantially not contain the inactive particles can impart excellent electromagnetic transducing characteristics to the obtained magnetic recording medium. On the other hand, when used as the base film of a magnetic recording medium, the laminated polyester film whose polyester layer A contains the inactive particles A can impart excellent travel durability to the obtained magnetic recording medium.

In the present invention, the average particle diameter of the inactive particles A contained in the polyester layer A is smaller than the average particle diameter of the inactive particles B contained in the polyester layer B described later. When the average particle diameter of the inactive particles A is larger than the average particle diameter of the inactive particles B contained in the polyester layer B, the surface of the polyester layer A of the obtained laminated polyester film is roughened. The average particle diameter of the inactive particles A is preferably ranged from 30 to 400 nm, more preferably from 40 to 200 nm, especially preferably from 50 to 100 nm. When the average particle diameter of the inactive particles A is smaller than the lower limit, the effect of the obtained travel durability is appreciably not developed. On the other hand, when the average particle diameter of the inactive particles A is larger than the upper limit, the surface of the polyester layer A of the obtained laminated polyester film is apt to be roughened, and the electromagnetic transducing characteristics of the obtained magnetic recording medium is liable to be lowered. A volume shape factor for expressing the shape of the inactive particles A is preferably ranged from 0.1 to $\pi/6$, further preferably from 0.2 to $\pi/6$, especially preferably 0.4 to $\pi/6$. The content of the inactive particles A of the polyester layer A is ranged from 0.001 to 0.2 percent by weight, further preferably ranged from 0.01 to 0.1 percent by weight, especially preferably 0.02 to 0.06 percent by weight, based on the weight of the polyester layer A. When the content of the inactive particles A is less than the lower limit, the effect of the obtained travel durability is appreciably not developed. Meanwhile, when the content of the inactive particles A is more; than the upper limit, the surface of the polyester layer A of the obtained laminated polyester film is apt to be roughened, and the electromagnetic transducing characteristics of the obtained magnetic recording medium is liable to be lowered.

The inactive particles A in the present invention may be particles comprising an inorganic compound or particles comprising an organic compound. The particles comprising the organic compound include the particles of one or more kinds of heat-resistant polymers selected from cross-linked silicone resins, cross-linked polystyrene, cross-linked acrylic resins, melamine-formaldehyde resin, aromatic polyamide resins, polyimide resins, polyamideimide resins, and cross-linked polyesters. The particles comprising the inorganic compound includes the particles comprising (1) a metal oxide (for example, aluminum oxide, titanium dioxide, silicon dioxide (silica), magnesium oxide, zinc oxide, zirconium oxide, or the like), (2) a metal carbonate (for example, magnesium carbonate, calcium carbonate, or the like), (3) a metal sulfate (for example, calcium sulfate, barium sulfate, or the like), (4) carbon (for example, carbon black, graphite, diamond, or the like), and (5) a clay mineral (for example, kaolin, clay, bentonite, or the like). In the present invention, preferable inactive particles A include cross-linked silicone resin particles, cross-linked polystyrene resin particles, melamine-formaldehyde resin particles, polyamideimide resin particles, aluminum oxide (alumina) particles, titanium dioxide particles, silicon dioxide particles, zirconium oxide particles, synthetic calcium carbonate particles, barium sulfate particles, diamond particles and kaolin particles. Among the particles, cross-linked silicone resin particles, cross-linked polystyrene resin particles, aluminum oxide (alumina) particles, titanium dioxide particles, silicon dioxide particles and calcium carbonate particles are especially preferable as the inactive particles A.

In the present invention, the polyester layer A may contain inactive particles A" having a smaller average particle diameter than the average particle diameter of the inactive particles A, further inactive particles A" having a smaller average particle diameter than the average particle diameter of the inactive particles A, and the like, in addition to the inactive particles A. The inactive particles A' and the inactive particles A" similarly include the particles exemplified as the above-described inactive particles A. Among these particles, preferable inactive particles A' and preferable inactive particles A" are inactive particles such as colloidal silica or alumina having a crystal form such as α-crystal form, γ-crystal form, δ-crystal form or θ-crystal form. The inactive particles A and the inactive particles A' or A" may be the same kind of the inactive particles or different kinds of inactive particles each other. When the inactive particles A and the inactive particles A' or A" are the same kind of the inactive particles having different average particle diameters, respectively, plural peaks appear in a particle size distribution curve obtained by measuring the particle diameter of each inactive particle. In the present invention, the peaks correspond to the particle size distributions of the inactive particles A, the inactive particles A' and the inactive particles A", respectively, and the average particle diameters of the inactive particles A, the inactive particles A and the inactive particles A" are determined from the peaks, respectively.

In the present invention, the polyester layer A may contain a pigment, a dyestuff, an antioxidant, an antistatic agent, a photostabilizer, a light screen for example, carbon black, titanium oxide, or the like), and/or the like.

<Polyester Layer B>

In the present invention, as the polyester for forming the polyester layer B, the same polyester as the polyester for forming the above-described polyester layer A may be used, when the upper limit of the content of the cyclic trimer is not more than 0.8 percent by weight based on the weight of the polyester layer B and when the terminal carboxyl group concentration is not more than 35 eq/$10^6$.

The upper limit of the cyclic trimer content of the polyester layer B in the present invention is not more than 0.8 percent by weight based on the weight of the polyester layer B. When the cyclic timer content exceeds the upper limit, the cyclic trimer is bled out from the inner portion of the polyester layer B in a process for producing the film or in a process for vapor-depositing the metal thin layer. The bled-out cyclic trimer is transferred to the surface of the polyester layer A to deteriorate the smoothness of the surface of the polyester layer A. The preferable upper limit of the content of the cyclic trimer is not more than 0.7 percent by weight, further not more than 0.6 percent by weight.

The cyclic trimer in the polyester layer B can be reduced by subjecting the polyester to a solid polymerization or extracting or hydrolyzing the cyclic trimer in the polyester. The cyclic trimer by-produced in the process for producing the base film can be reduced by lowering temperature or shortening the time of a melted state in a melt-extrusion condition in the process for producing the film. As disclosed in JP-A 5-222171, the cyclic trimer by-produced in the process for producing the base film can also be reduced by bringing the polyester reduced in the cyclic trimer into contact with water or steam at not less than 70° C. for 3 hours to reduce the activity of the catalyst left in the polyester.

In the present invention, the polyester for forming the polyester layer B has a terminal carboxyl group concentration of not more than 35 eq/$10^6$ g. When said terminal carboxyl group concentration exceeds the upper limit, foreign matters such as such as oligomers in the polyester layer B are bled out in a large amount. The bled-out foreign matters are transferred to the surface of the polyester layer A to deteriorate the smoothness of the surface of the polyester layer A. Said terminal carboxyl group concentration is preferably not more than 30 eq/$10^6$ g. For the reduction in the terminal carboxyl group concentration of the polyester for forming the polyester layer B, a method itself known widely may be adopted. The known method includes a method for lowering temperature or shortening a retention time in a melted state in a melt-extrusion condition to control the increase in the terminal, carboxyl groups, in a process for producing the laminated polyester film, and a method for reducing the terminal carboxyl groups of the polyester by a solid phase polymerization.

In the present invention, it is preferable that the polyester for forming the polyester layer B contains diethylene glycol (DEG) in an amount ranged from 0.3 to 3.0 percent by weight based on the weight of the polyester layer B. The DEG is by-produced in the process for producing the polyester or is added as a copolymerization component. When the content of the DEG in the polyester layer B is lower than the lower limit, the inactive particles B contained in the polyester layer B are liable to be dropped out. On the other hand, when the content of the DEG in the polyester layer B exceeds the upper limit, the mechanical strength of the base film is lowered. The preferable content of the DEG in the polyester layer B is ranged from 0.4 to 2.5 percent by weight, especially from 0.5 to 2.2 percent by weight.

In the present invention, the intrinsic viscosity of the polyester for forming the polyester layer B is preferably not less than 0.55 dl/g, more preferably not less than 0.57 dl/g, especially preferably not less than 0.6 dl/g, measured in ortho-chlorophenol as a solvent at 35° C. When the intrinsic viscosity is lower than the lower limit, oligomers in the polyester layer B and projections on the surface of the polyester B are sometimes transferred to the surface of the polyester layer A to deteriorate the smoothness of the surface of the polyester layer A. It is preferable that the upper limit of the intrinsic viscosity is not more than 1.0 dl/g, because the productivity of the polyester is excessively not lowered.

In the present invention, the catalysts used for producing the polyester for forming the polyester layer B include the same catalysts as the catalysts for producing the polyester for forming the above-mentioned polyester layer A.

When a germanium compound is used as a polymerization catalyst for the polyester for forming the polyester layer B, the content of the germanium compound is preferably 1 to 50 ppm, more preferably 5 to 40 ppm, as germanium element (Ge), based on the weight of the polyester layer B. When the germanium element amount in the polyester layer B is within the above-mentioned range, the dropping of dumps on the surface of the polyester layer B can be controlled, and the staining of the process due to foreign matters such as oligomers in the polyester layer B can be controlled. The polyester having a germanium element amount within the above-mentioned range includes a polyester produced using a germanium compound (catalyst), a polyester produced together using a germanium compound (catalyst) and one or more other metal compounds (catalyst) except the germanium compound (catalyst), and a mixture of the polyester polymerized using a germanium compound (catalyst) with a polyester polymerized using a metal compound (catalyst) except the germanium compound (catalyst).

When an antimony compound is used as a polymerization catalyst for the polyester for forming the polyester layer B, the content of the antimony compound is preferably 10 to 350 ppm, more preferably 20 to 300 ppm, as antimony element (Sb), based on the weight of the polyester layer B. When the antimony element (Sb) amount is within the above-mentioned range, the dropping of dumps due to the inactive particles B on the polyester layer B can be controlled, and the staining of the process due to the migration of foreign matters such as oligomers can be controlled. The polyester having an antimony element amount within the above-mentioned range includes a polyester produced singly using an antimony compound (catalyst), a polyester produced together using an antimony compound (catalyst) and one or more other metal compounds (catalyst) except the antimony compound (catalyst), and a mixture of the polyester polymerized using an antimony compound (catalyst) with a polyester polymerized using a metal compound (catalyst) except the antimony compound (catalyst).

When a titanium compound is used as a polymerization catalyst for the polyester for forming the polyester layer B, the content of the titanium compound is preferably 3 to 25 ppm, more preferably 5 to 20 ppm, as titanium element (Ti), based on the weight of the polyester layer B. When the amount of Ti is less than the lower limit, it is difficult to sufficiently develop the effect as a polycondensation catalyst. On the other hand, when the amount of Ti is more than the upper limit, the thermal stability of the polyester is occasionally lowered. The polyester having the amount of Ti within the above-described range includes a polyester produced singly using a titanium compound (catalyst), a polyester produced together using a titanium compound (catalyst) and one or more other metal compounds (catalyst) except the titanium compound (catalyst), and a mixture of the polyester polymerized using a titanium compound (catalyst) with a polyester polymerized using a metal compound (catalyst) except the titanium compound (catalyst).

The polyester layer B preferably contains a phosphorous compound. The phosphorous compound is added in a process for producing the polyester, and enhances the thermal stability of the polyester for forming the polyester layer A. The phosphorous compound used in the present invention includes phosphorous compounds themselves known well, especially preferably ortho-phosphoric acid, phosphorous acid, trimethyl phosphate, triethyl phosphate, and tri-n-butyl phosphate.

In the present invention, the polyester layer B contains the inactive particles B having an average particle diameter of 50 to 1000 nm in an amount of 0.001 to 1 percent by weight based on the weight of the polyester layer B. When the average particle diameter of the inactive particles B is smaller than the lower limit, the winding-up property and blocking resistance of the base film are deteriorated. On the other hand, when the average particle diameter is larger than the upper limit, the surface of the polyester layer A is roughened with the inactive particles B to deteriorate the electromagnetic transducing characteristics of a magnetic recording medium to be obtained. The preferable average particle diameter of the inactive particles B is ranged preferably from 100 to 800 nm, more preferably from 150 to 700 nm, especially preferably 200 to 600 nm. When the content of the inactive particle B is less than the lower limit, the winding-up property and blocking resistance of the base film are deteriorated. On the other hand, when the content of the inactive particles B exceeds the upper limit, the surface of the polyester layer A is roughened with the inactive particles B to deteriorate the electromagnetic transducing characteristics of a magnetic recording medium to be obtained. The preferable content of the inactive particles B is preferably ranged from 0.005 to 0.8 percent by weight, more preferably 0.01 to 0.6 percent by weight, especially preferably 0.01 to 0.2 percent by weight. In the present invention, the inactive particles B similarly include the particles exemplified for the above-described inactive particles A.

In the present invention, the polyester layer B may contain inactive particles B' having a smaller average particle diameter than the average particle diameter of the inactive particles B, further inactive particles B" having a smaller average particle diameter than the average particle diameter of the inactive particles B', and the like, in addition to the inactive particles B. The average particle diameters of the inactive particles B' and the inactive particles B" are preferably 5 to 450 nm, more preferably from 10 to 400 nm, especially preferably 30 to 350 nm. Additionally, the contents of the inactive particles B' and the inactive particles B" are preferably 0.005 to 1 percent by weight, more preferably from 0.01 to 0.7 percent by weight, especially preferably 0.02 to 0.5 percent by weight. The inactive particles B' and the inactive particles B" similarly include the particles exemplified as the above-described inactive particles A. Among these particles, preferable inactive particles B' and preferable inactive particles B" are inactive particles such as colloidal silica or alumina having a crystal form such as α-crystal form, γ-crystal form, δ-crystal form or θ-crystal form. The inactive particles B and the inactive particles B' or B" may be the same kind of the inactive particles or different kinds of inactive particles each other. When the inactive particles B and the inactive particles B' or B" are the same kind of the inactive particles having different average particle diameters, respectively, a plurality of peaks appear in a particle size distribution curve obtained by measuring the particle diameter of each inactive particle. In the present invention, the peaks correspond to the particle size distributions of the inactive particles B, the inactive particles B' and the inactive particles B", respectively, and the average particle diameters of the inactive particles B, the inactive particles B' and the inactive particles B" are determined from the peaks, respectively.

In the present invention, it is preferable that the polyester layer B contains an ester compound comprising an aliphatic monocarboxylic acid having eight or more carbon atoms and a polyhydric alcohol in an amount of 0.001 to 1 percent by weight.

The above-described aliphatic monocarboxylic acid has eight or more carbon atoms, and the upper limit of the carbon atoms is preferably at most 34 carbon atoms. When the aliphatic monocarboxylic acid has less than eight carbon atoms, the heat resistance of the obtained ester compound is poor, and the ester compound is decomposed in a heating condition under which the polyester for forming the polyester layer B is dispersed. Such the aliphatic monocarboxylic acid includes pelargonic acid, capric acid, undecylic acid, lauric acid, tridecylic acid, myristic acid, pentadecylic acid, palmitic acid, heptadecylic acid, stearic acid, nonadecanoic acid, arachic acid, behenic acid, lignoceric acid, cerotic acid, montanic acid, melissic acid, hentriacontanoic acid, petroselinic acid, oleic acid, erucic acid, linoleic acid and the mixtures of acids including these acids.

In addition, the polyhydric alcohol component is a polyhydric alcohol having two or more hydroxyl groups, and is preferably a polyhydric alcohol having three or more hydroxyl groups from the viewpoint of heat resistance. When a monoalcohol is used as the alcohol component, the heat resistance of the ester compound is insufficient. The preferable polyhydric alcohol having two hydroxyl groups includes ethylene glycol, propylene glycol, trimethylene glycol, 1,4-butanediol, 1,5-pentanediol, 1,6-hexanediol, 1,7-heptanediol, 1,8-octanediol, 1,9-nonanediol, 1,10-decanediol, diethylene glycol, triethylene glycol, and polyethylene glycol. The preferable polyhydric alcohol having three or more hydroxyl groups includes glycerol, erythritol, threitol, pentaerythritol, arabitol, xylitol, talitol, sorbitol, and mannitol.

The above-described ester compound comprising the aliphatic monocarboxylic acid and the polyhydric alcohol is a monoester, a diester, a triester, or the like, for example, in dependence on the number of the hydroxyl groups of the polyhydric alcohol. From the viewpoint of the heat resistance, the diester is more preferable than the monoester, and the triester is further more preferable than the diester. The preferable ester compound concretely includes sorbitan tristearate, pentaerythritol tribehenate, pentaerythritol distearate, glycerol tristearate, glycerol tripalmitate, and polyoxyethylene distearate.

The above-described ester compound comprising the aliphatic monocarboxylic acid and the polyhydric alcohol includes partial ester compounds as being understood from the above-described exemplified compounds. The partial ester compounds are obtained by esterifying a higher fatty acid having eight or more carbon atoms with a polyhydric alcohol and then saponifying the obtained ester with a divalent or more-valent metal hydroxide. Concretely, the partial ester compounds include Wax E, Wax OP, Wax O, Wax OM, and Wax FL (all, trade names, produced by Hoechst Corp (Ltd.)), which are obtained by saponifying a montanoic acid diol ester with calcium hydroxide. Of course, these (partial) ester compounds may singly be used or plurally together be used.

In the present invention, the amount of the above-described (partial) ester compound contained in the polyester layer B is ranged preferably from 0.001 to 1 percent by weight, further preferably from 0.003 to 0.5 percent by weight, more further preferably from 0.005 to 0.5 percent by weight, especially preferably from 0.01 to 0.3 percent by weight, based on the weight of the polyester layer B. When the content of the (partial) ester compound is less than the lower limit, the winding-up property-improving effect and blocking-inhibiting effect of the obtained film are insufficient. On the other hand, when the content of the (partial) ester compound is more than the upper limit, a large amount of the ester compound bled out on the surface of the polyester layer B is transferred to the surface of the polyester layer A brought into contact with the polyester layer B on the winding of the film on a roll, whereby the adhesivity of the polyester layer A to a magnetic layer is lowered, when the magnetic layer is disposed on the surface of the polyester layer A.

In the present invention, the polyester layer B may contain a pigment, a dyestuff, an antioxidant, an antistatic agent, a photostabilizer, a light screen (or example, carbon black, titanium oxide, or the like), and/or the like, similarly to the polyester layer A.

<Laminated Polyester Film>

The laminated polyester film of the present invention is a laminated film obtained by laminating the above-described polyester layer B to one side of the above-described polyester layer A. The polyester layer A and the polyester layer B for forming the laminated polyester film may be formed from different polyesters, respectively, or from an identical polyester. Preferable examples include a laminated polyester film whose polyester layer A (or layer B) comprises poly(ethylene terephthalate) and whose polyester layer B (or layer A) comprises poly(ethylene-2,6-naphthalene dicarboxylate), and a laminated polyester film whose polyester layers A and B comprise poly(ethylene terephthalate) (or poly(ethylene-2,6-naphthalene dicarboxylate)). Among the films is preferable the laminated polyester film whose polyester layers A and B are formed from the identical polyester.

The surface (the surface not contacted to the polyester layer B) of the polyester layer A of the laminated polyester film has a central plane average surface roughness (WRaA) of preferably 0.1 to 4 nm, further preferably 0.2 to 3.5 nm, more further preferably 0.3 to 3.0 nm, especially preferably 0.4 to 2.5 nm. When WRaA is lower than the lower limit, the slipperriness of the base film is deteriorated, and the handling of the base film is liable to be difficult. On the other hand, when the WRaA exceeds the upper limit, the electromagnetic transducing characteristics of the obtained electromagnetic recording medium is apt to be lowered. The WRaA surface roughness can be adjusted, for example, by changing the particle diameters and addition amount of the inactive particles B, when the inactive particles A are not added to the polyester layer A or by changing the particle diameters and addition amounts of the inactive particles A and the inactive particles B, when the inactive particles A are added to the polyester layer A.

The surface of the polyester layer B of the laminated polyester film has a ten point-average surface roughness (WRzB) of 30 to 300 nm, further preferably 40 to 250 nm, especially preferably 50 to 200 nm. When WRzB is smaller (flatter) than the lower limit, the slipperriness of the base film is deteriorated, and the handling of the film is liable to be difficult. On the other hand, when the WRzB exceeds the upper limit, the projections on the surface of the polyester layer B are sometimes transferred to the surface of the polyester layer A to deteriorate the electromagnetic transducing characteristics of the obtained electromagnetic recording medium. The WRzB can be adjusted, for example, by changing the particle diameters and addition amount of the inactive particles B.

The Young's modulus of the laminated polyester film in the film-producing direction (longitudinal direction) is preferably not less than 4500 N/mm$^2$, further preferably not less than 4800 N/mm$^2$, more further preferably not less than 5500 N/mm$^2$, especially preferably not less than 5500 N/mm$^2$. When the Young's modulus of the laminated polyester film in the longitudinal direction is lower than the lower limit, the head touch and travel durability of the obtained magnetic recording medium is deteriorated. Further, when the Young's modulus of the laminated polyester film in the longitudinal direction is lower than the lower limit, the thickness of the base film is enlarged to give a magnetic recording medium having head touch and travel durability which can resist to practical uses, consequently lowering the recording capacity of the obtained magnetic recording medium. In addition, the Young's modulus of the laminated polyester film in the direction (width direction) orthogonal to the film-producing direction is preferably not less than 6000 N/mm$^2$, further preferably not less than 6800 N/mm$^2$, more further preferably not less than 8000 N/mm$^2$, especially preferably not less than 10.000 N/mm$^2$. When the Young's modulus of the laminated polyester film in the width direction is lower than the lower limit, the head touch and travel durability of the obtained magnetic recording medium are lowered. Further, when the Young's modulus of the laminated polyester film in the width direction is lower than the lower limit, the thickness of the base film is enlarged to give a magnetic recording medium having head touch and travel durability which can resist to practical, consequently lowering the recording capacity of the obtained magnetic recording medium. The Young's moduli of the laminated polyester film in the longitudinal direction and in the width direction can be adjusted, for example, by changing stretching conditions, when the base film is produced.

When the polyester for forming the polyester layer A or the polyester layer B is poly(ethylene terephthalate), it is preferable that the crystallinity of the polyester for forming the polyester layer A or the polyester layer B is ranged from 30 to 50%. Further, when the polyester for forming the polyester layer A or the polyester layer B is poly(ethylene-2,6-naphthalene dicarboxylate), it is preferable that the crystallinity of the polyester for forming the polyester layer A or the polyester layer B is ranged from 28 to 38%. When the crystallinity is less than the lower limit, the thermal shrinkage factor of the laminated polyester film is enlarged to deteriorate the dimensional stability. On the other hand, when the crystallinity exceeds the upper limit, the abrasion resistance of the laminated polyester film is lowered, and white powder is therefore liable to be produced, when the polyester film is rubbed with a roll or a guide pin in a process for producing the film or in a process for processing the film. The crystallinity can be adjusted by changing a stretching ratio, a stretching temperature, a heat set treatment temperature, or the like in the process for producing the film.

The thickness of the laminated polyester film is preferably not less than 2 μm and less than 8 μm, more preferably ranged from 2.5 to 7.5 μm. Among the thickness of the polyester A and the thickness of the polyester layer B, the thickness of the polyester layer B is preferably 1/50 to 1/2, more preferably 1/30 to 1/3, especially preferably 1/20 to 1/4, based on the thickness of the laminated polyester film.

In the laminated polyester film of the present invention, it is preferable to dispose the later-described coating film layer C on the surface of the polyester layer A of the laminated polyester film, because adhesion to a magnetic layer, the handleability of the base film, and the like can be improved, when a magnetic recording medium is formed from the laminated polyester film.

<Coating Film Layer C>

The coating film layer C comprises a binder resin and inactive particles C. The binder resin is preferably an aqueous polyester resin, an aqueous acrylic resin, an aqueous polyurethane resin, or the like, especially preferably an aqueous polyester resin comprising a polybasic carboxylic acid and a polyhydric hydroxy compound. Herein, the "aqueous" means "can be dissolved, emulsified or finely dispersed in water", and a binder resin capable of being emulsified or finely dispersed in water is especially preferable.

The above-described polybasic carboxylic acid preferably includes isophthalic acid, phthalic acid, 1,4-cyclohexanedicarboxylic acid, 2,6-naphthalenedicarboxylic acid, 4,4'-diphenyldicarboxylic acid, adipic acid, sebacic acid, dodecanedicarboxylic acid, succinic acid, sodium-5-sulfoisophthalic acid, potassium-2-sulfoterephthalic acid, trimellitic acid, trimesic acid; monopotassium trimellitate, and p-hydroxybenzoic acid. The above-described polyhydric hydroxy compound preferably includes ethylene glycol, diethylene glycol, propylene glycol, 1,4-butanediol, 1,6-hexanediol, 1,4-cyclohexanedimethanol, p-xylylene glycol, dimethylolpropane, and bisphenol A ethylene oxide adduct. The aqueous polyester resin further includes an acryl-modified polyester resin prepared by bonding, for example, an acryl polymer chain to a polyester chain. The modified polyester resin such as the acryl-modified polyester resin may be a graft polymer, a block copolymer or a polymer mixture in which two kinds of polymers form a specific physical structure (IPN (interpenetrating polymer network) type, core-shell type, or the like) in microparticles. For example, sulfonate groups, carboxylate groups or a polyether component may be introduced into the molecule of the binder resin to develop a hydrophilic property.

The above-described inactive particles C include the particles exemplified for the above-described inactive particles A, and are preferably inactive particles having a relatively small gravity, because the particles hardly precipitate in a coating liquid used on the formation of a coating film. The inactive particles having such the relatively small specific gravity preferably includes organic particles comprising a heat-resistant resin such as a cross-linked silicone resin, an acrylic resin, polystyrene, melamine-formaldehyde resin, an aromatic polyamide resin, a polyamideimide resin, a cross-linked polyester, or a wholly aromatic polyester, and inorganic particles comprising an inorganic material such as silicon dioxide (silica) or calcium carbonate. Among the particles, cross-linked silicone resin particles, acrylic resin particles, silica particles and core-shell type organic particles for example, particles comprising cross-linked polystyrene as the core and polymethyl methacrylate as the shell) can preferably be cited.

The inactive particles C have an average particle diameter of preferably 10 to 50 nm, more preferably 12 to 45 nm, especially preferably 15 to 40 nm. When the average particle diameter is smaller than the lower limit, the slipperiness of the laminated polyester film is occasionally deteriorated. On the other hand, when the average particle diameter exceeds the upper limit, the electromagnetic transducing characteristics of the obtained magnetic recording medium is sometimes lowered. The shape of the inactive particles C has a volume shape factor (f) of preferably 0.1 to π/6, more preferably 0.2 to π/6, especially preferably 0.4 to π/6. The shape of a particle having a volume shape factor (f) of π/6 is a sphere (true sphere). On the other hand, the shape of the particle having a volume shape factor (f) of less than 0.1 is, for example, a flaky shape, and hardly develops the effect for improving the travel durability of the laminated polyester film due to the inactive particles C. The shape of the particle having a volume shape factor (f) of 0.4 to π/6 is ranged from an oval shape such as a rugby ball to a true spherical shape, and facilitates the development of the effect for improving the travel durability of the laminated polyester film due to the inactive particles C. The content of the inactive particles C is preferably 0.5 to 30 percent by weight, more preferably 2 to 20 percent by weight, especially preferably 3 to 10 percent by weight, based on the weight of the coating film layer C (solid content of the coating liquid). When the content is less than the lower limit, the slipperiness of the laminated polyester film is occasionally deteriorated. On the other hand, when the content exceeds the upper limit, the electromagnetic transducing characteristics of the obtained magnetic recording medium is sometimes lowered.

The surface (the polyester layer A-non-contacted surface of the coating film layer C) of the coating film layer C of the laminated polyester film has preferably a central plane average surface roughness (WRaC) of preferably 0.1 to 4 nm, further preferably 0.2 to 3.5 nm, more further preferably 0.3 to 3.0 nm, especially preferably 0.4 to 2.5 nm. When the WRaC is flatter than the lower limit, the slipperiness of the laminated polyester film is sometimes lowered. On the other hand, when the WRaC exceeds the upper limit, the electromagnetic transducing characteristics of the obtained magnetic recording medium is occasionally lowered. The WRaC can be adjusted by changing the particle diameter and addition amount of the inactive particles. The thickness of the coating film C is preferably 1 to 100 nm, more preferably 2 to 50 nm, more further preferably 3 to 10 nm, especially preferably 3 to 8 nm.

<Method for Producing the Laminated Polyester Film>

The laminated polyester film can be produced by a method itself known widely. The lamination structure of the polyester layer A and the polyester layer B is preferably formed by a coextrusion method, and the lamination of the coating film layer C is preferably formed by a coating method. Hereinafter, the method for producing the laminated polyester film will be explained using a biaxially oriented polyester film.

The laminated polyester film is produced as follows. A polyester containing the inactive particles B and a polyester not containing the inactive particles or containing the inactive particles A are subjected to high precision filtration treatments, respectively, laminated in an extrusion die (multi-manifold method) or in a place in front of the die (feed block method) in a melted state, coextruded from the die in a film-like shape at a temperature of the melting point (Tm) of the polyester to (Tm+70)° C., and then quenched and solidified on a cooling roll of 40 to 90° C. to obtain the un-oriented laminated film. Said un-oriented laminated film is stretched at a stretch ratio of 2.5 to 8.0:1, preferably 3.0 to 7.5:1, in the film-producing direction at a temperature of (Tg−10) to (Tg+70)° C. (wherein, Tg is the glass transition temperature of the polyester) by a conventional method, and then stretched at a stretch ratio of 2.5 to 8.0:1, preferably 3.0 to 7.5:1, in the direction (width direction) orthogonal to the film-producing direction at a temperature of (Tg) to (Tg+70)° C. If necessary, the prepared film may again be stretched in the film-producing direction and/or in the width direction. Namely, two stage, three stage, four stage or multi-stage stretching treatments may be carried out. The total stretch ratio (the total stretch ratio in the film-producing direction×the total stretch ratio in the width direction) is preferably not less than 9:1, more preferably 10 to 35:1, especially preferably 12 to 30:1.

The film is further heat-set and crystallized at a temperature of (Tg+70) to (Tm−10)° C. (wherein, Tm is the melting point of the polyester), for example, 180 to 250° C. in the case of poly(ethylene terephthalate), to impart excellent dimensional stability. Therein, the time for the heat set is preferably 1 to 60 seconds.

When the laminated polyester film is produced, if necessary, additives except the above-described inactive particles, such as an ester compound, a stabilizer, a colorant and an intrinsic resistivity-adjusting agent for the melted polymer, may be added to the polyester layer A or the polyester layer B.

Subsequently, a method for producing the laminated polyester film having the coating film layer C laminated thereto will be explained. It is preferable that the lamination of the coating film C is carried out by a method for coating a water-based coating.

The coating is preferably carried out on the surface of the polyester layer A before the application of the final stretching treatment, and the coated film is then preferably stretched in the film-producing direction or in the width direction. The coating is more preferably carried out on the un-stretched laminated polyester film, on the monoaxially stretched laminated polyester stretched in the film-producing direction or in the width direction, or especially preferably on the monoaxially stretched laminated polyester stretched in the film-producing direction. The coating film layer C is dried after coated and before or while stretched. As a method for the coating may be adopted a method itself known widely, preferably such as a roll-coating method or a die coating method. The solid content concentration of the coating liquid, especially the water-based coating, is preferably 0.2 to 8 percent by weight, further preferably 0.3 to 6 percent by weight, especially preferably 0.5 to 4 percent by weight. The coating liquid may further contain a surfactant, a stabilizer, a dispersant, a UV light absorbent, a thickener, and the like, in addition to the binder resin and the inactive particles C.

Thus, the laminated polyester film in which the polyester layer B is laminated to one side of the polyester layer A, and the laminated polyester film in which the coating film layer C is further laminated to the surface of the polyester layer A of the laminated polyester film can be produced.

<Magnetic Recording Medium>

The magnetic recording medium of the present invention comprises the laminated polyester film of the present invention and a magnetic layer laminated to the surface of the polyester layer A or coating film layer C of the laminated polyester film, and will hereinafter be described in detail.

The magnetic recording medium of the present invention can be produced by forming a ferromagnetic metal thin film layer comprising iron, cobalt, nickel, chromium or an alloy or oxide containing the metals as a main component on the surface of the polyester layer A, preferably the coating film layer C, of the laminated polyester film by a method such as a vacuum vapor deposition method, a sputtering method or an ion plating method. The thickness of the metal thin film layer is preferably 100 to 300 nm. In the above-described magnetic recording medium, a protecting layer comprising diamond-like carbon (DLC) or the like, and further a fluorine-containing carboxylic acid-based lubricant layer may sequentially be disposed on the surface of the ferromagnetic metal thin film layer. In the above-described magnetic recording medium having the protecting layer disposed thereon, a back coat layer itself known widely may be disposed on the surface of the polyester layer B of the laminated polyester film. The ferromagnetic metal thin film type magnetic recording medium obtained thus can be used as a vapor deposition type magnetic recording medium (for example, a magnetic tape medium for Hi8 used for recording analog signals, or for digital video cassette recorder (DVC), data 8 mm or DDSIV used for recording digital signals) which is especially excellent in electromagnetic transducing characteristics such as output, S/N, and C/N in the short wavelength region, is little in dropouts and error rate, and is used for recording in high densities. Especially, the above-described ferromagnetic metal thin film type magnetic recording medium can suitably be used as a digital video tape or a data storage tape.

Further, the magnetic recording medium of the present invention can be produced by coating the surface of the polyester layer A, preferably the coating film layer C, of the laminated polyester film with a coating liquid prepared by homogeneously dispersing needle-like fine magnetic powder (metal powder) comprising iron or containing the iron as a main component in a binder such as polyvinyl chloride or vinyl chloride•vinyl acetate copolymer. The thickness of the magnetic layer formed by the coating is preferably not more than 1 μm, more preferably 0.1 to 1 μm. In said magnetic recording medium, a back coat layer itself known widely may be disposed on the surface of the polyester layer B of the laminated polyester film. The magnetic recording medium obtained thus can be used as a metal-coating type magnetic recording medium which is especially excellent in electromagnetic transducing characteristics such as output, S/N, and C/N in the short wavelength region, is little in dropouts and error rate, and is used for recording in high densities. Additionally, a primer layer (non-magnetic layer) prepared by dispersing fine titanium oxide particles or the like in the same organic binder as the binder in the magnetic layer may be disposed between the laminated polyester film and the magnetic layer. The metal-coating type magnetic recording medium having the primer layer can highly suitably used as a magnetic tape medium for 8 mm video, Hi8, β-cam SP, or W-VHS for recording analog signals, digital video cassette recorder (DVC), data 8 mm, DDSIV, digital β-cam, D2, D3, SX or the like, for recording digital signals.

Further, the magnetic recording medium of the present invention can also be produced by coating the surface of the polyester layer A, preferably the coating film layer C, of the laminated polyester film with a coating liquid prepared by homogeneously dispersing the needle-like fine magnetic powder of iron oxide, chromium oxide, or the like or the plate-like fine magnetic powder of barium ferrite or the like in a binder such as polyvinyl chloride or vinyl chloride•vinyl acetate copolymer. The thickness of the magnetic layer formed by the coating is preferably not more than 1 μm, more preferably 0.1 to 1 μm. In said magnetic recording medium, a back coat layer itself known widely may be disposed on the surface of the polyester layer B of the laminated polyester film. The magnetic recording medium obtained thus can be used as an oxide-coating type magnetic recording medium which is especially excellent in electromagnetic transducing characteristics such as output, S/N, and C/N in the short wavelength region, is little in dropouts and error rate, and is used for recording in high densities. Additionally, a primer layer (non-magnetic layer) prepared by dispersing fine titanium oxide particles or the like in the same organic binder as the binder in the magnetic layer may be disposed between the laminated polyester film and the magnetic layer. The metal-coating type magnetic recording medium having the primer layer can highly suitably used as a metal-coating type magnetic recording medium for QIC for a data streamer used for recording digital signals, or the like. The oxide-coating type magnetic recording medium having the primer layer can also highly suitably used as a metal-coating type magnetic recording medium for QIC for a data streamer used for recording digital signals, or the like.

The above-described back coat layer can usually be formed by coating a coating liquid comprising solid particles and a binder. To the coating liquid, if necessary, various additives may be added. As the solid particles, the binders and the additives, solid particles, binders and additives themselves known widely can be used, respectively. The thickness of the back coat layer is preferably 0.3 to 1.5 μm.

The above-described W-VHS is a VTR for recording analog HDTV signals, and the DVC can be applied as a recorder for recording digital HDTV signals. Therefore, the laminated polyester film of the present invention is a base film which is highly useful for a magnetic recording medium for VTR corresponding to HDTV.

EXAMPLES

The present invention will hereafter further be explained with Examples. The [parts] and [percent] in the Examples and Comparative examples are [parts by weight] and [percent by weight], respectively, unless otherwise noted. In addition, various physical properties and characteristics in the present invention are measured and defined as follows.

(1). Intrinsic Viscosity

The intrinsic viscosity is determined from a value measured in ortho-chlorophenol solvent at 35° C.

(2). Amount of Germanium Element (Ge), the Amount of Antimony Element (Sb), and the Amount of Titanium Element (Ti)

A polyester to be measured is shaven out from the polyester layer B or the polyester layer A. The shaven polyester is subjected to a wet decomposition treatment in a 1:1 mixture liquid of nitric acid and sulfuric acid, and then to the determination of germanium element and antimony element with a high frequency plasma emission spectroscopic analyzer (Atom Comp Series 800, manufactured by Jarrell-Ash Corp.). When the polyester contains inactive particles having Ge, Sb or Ti, the polyester is measured, after the inactive particles are removed.

(3). Content of the Cyclic Trimer

A polyester is shaven out from the polyester layer B, dissolved in a 1:1 mixture liquid of hexafluoroisopropanol and chloroform, and further diluted with chloroform to give a concentration of 0.05 percent by weight. The obtained solution is filtered through a millipore filter and then subjected to the determination of the content of the cyclic trimer with ALC/GPC744 manufactured by Waters Corp.

(4). Concentration ($eq/10^6$ g) of the Terminal Carboxyl Groups

The concentration of the terminal carboxyl groups is measured according to the method of A. Conix (Makromol. Chem. 26, 226 (1958)).

(5). Amount of the Diethylene Glycol (DEG)

A polyester is shaven out from the polyester layer A or the polyester layer B, dissolved in $CDCl_3$ (deuterium chloroform)/$CF_3COOD$ (deuterium trifluoroacetic acid) mixture solvent (1/1), and then measured using $^1H$-NMR.

(6). Tm (Melting Point) and Tc (Temperature-fall Crystallization Temperature) of the Polyester The Tm (melting point) and Tc (temperature-fall crystallization temperature) of the polyester are measured by a method comprising shaving out the polyester from the polyester layer A, putting 10 mg of the obtained sample in a pan for DSC measurement, heating and melting the sample on a stage heated at 290° C. for five minutes, quickly quenching and solidifying the sample pan on an aluminum foil spread over ice, measuring the melting point of the solidified sample with du Pont Instruments 910 DSC at a temperature-rising rate of 20° C./minute, cooling the sample at a temperature-fall rate of 10° C./minute, after reaching a 300° C. melting state, and measuring the temperature-fall crystallization temperature of the sample. The Δ Tcm described in the present invention is a parameter given by subtracting the Tc determined by the present method from the Tm determined by the present method.

(7). Average Particle Diameter (I) of the Inactive Particles (Average Particle Diameter: Not Less Than 60 nm)

A measurement is carried out using [CP-50 type Centrifugal Particle Size Analyzer] manufactured by Kabushiki Kaisha Shimadzu Seisakusho. Particles having each particle diameter and their amounts are calculated on the basis of the obtained centrifugal precipitation curve, and a particle diameter [equivalent sphere diameter] corresponding to 50 mass percent is read out from the integration curve of the particles with their amounts. The value is used as the above-described average particle diameter (nm) ([Particle Size Measurement Technology] issued by Nikkankogyo Shinbun Co., 1975, page 242 to 247).

(8). Average Particle Diameter (II) of the Particles (Average Particle Diameter: Less Than 60 nm)

Particles having an average particle diameter of less than 60 nm are measured by a light-scattering method. Concretely, the [equivalent sphere diameter] of a particle at the point of 50% of all the particles, determined using a trade name [NICOMP MODEL 270 SUBMICRON PARICLE SIZER] manufactured by Nicomp Instruments Inc. Ltd. is defined as the average particle diameter (nm).

(9). Volume Shape Factor (f) of the Inactive Particles

The photograph of each inactive particle is taken with a scanning type electron microscope at a magnification corresponding to the size of the inactive particle. The average projected plane maximum diameter (D) (μm) of the projected plane maximum diameters of the particles and the circle-converted, protected plane average particle diameter determined from the projected areas of the particles are determined from the taken photographs by the use of an image analysis treatment device: Ruzekkusu 500 (manufactured by Nippon Regulator Co.). The volume shape factor (f) of the inactive particles is calculated from the sphere-converted volume (V) $μm^3$) determined from the projected plane average particle diameter and the average projected plane maximum diameter (D) (μm) according to the following expression (I).

$$f = V/D^3 \qquad (I)$$

(10). Thickness of the Polyester Layer A, the Thickness of the Polyester Layer B and the Thickness of the Laminated Polyester Film The thickness of the laminated polyester film is determined by randomly measuring at ten points with a micrometer and then averaging the measured values. The thickness of the polyester layer A and the thickness of the polyester layer B, namely the thickness of the thin polyester layer, is determined as follows. The polyester layer is analyzed with a secondary ion mass spectrometer (SIMS) from the surface to a depth of 5,000 nm, while the concentration ratio (M+/C+) of a metal element (M+) to the hydrocarbon (C+) of the polyester is defined as a particle concentration. The metal element (M+) is caused by the highest concentration particles among the particles in the film in a range of from the surface layer excluding the coating film layer to a depth of 5,000 nm. The particle concentration of the surface layer is low due to the interface at the surface layer, while the particle concentration is enhanced with the increase in the distance from the surface. In the present invention, there are a case in which the particle concentration is once stabilized to a stable value 1 and then enhanced to a stable value 2, and a case in which the particle concentration is simply decreased. On the basis of the distribution curve, in the former case, a depth giving a particle concentration of (stable value 1+stable value 2)/2 is the thickness (μm) of the thin polyester layer, and in the latter case, a depth giving ½ of the stable value 1 (the depth is larger than the depth giving the stable value 1) is the thickness (μm) of the thin polyester layer.

Measurement conditions are follows.

(a). Measurement device

A secondary ion mass spectrometer (SIMS); [6300], manufactured by PERKIN ELMER INC.

(b). Measurement conditions

Primary ion species: $O^{2+}$

Primary ion acceleration voltage: 12 kV

Primary ion electric current: 200 nA
Raster area: 400 µm□
Analysis area: gate 30%
Measurement vacuum degree: $6.0 \times 10^{-9}$ Torr ($8.0 \times 10^{-7}$ Pa)
E-GUNN: 0.5 kV-3.0 A When particles mostly existing in the range of from the surface, layer to the 5,000 nm are organic polymer particles except silicone resin particles, a measurement using SIMS is difficult. Therefore, while the polyester layer is etched from the surface, the same concentration distribution curve as described above is measured by FT-IR (Fourier transform infrared spectroscopy) or XPS (X-ray photoelectric spectrophotometry) in dependence on the particles to determine the thickness (µm) of the layer.

Additionally, the thickness of a thick polyester layer is determined by subtracting the thickness of the coating film layer and the thickness of the thin polyester layer from the thickness of the laminated polyester film.

(11). Thickness of the Coating Film Layer C

A small film piece is fixed and molded with an epoxy resin, and then cut with a microtome to form a super thin section having a thickness of about 600 angstrom (cut in parallel to the flow direction of the film). The obtained specimen is observed with a transmission electron microscope (H-800 type: manufactured by Kabushiki Kaisha Hitachi Seisakusho), and the interface of the coating film layer C is searched to determine the thickness (nm) of the coating film layer.

(12). Central Plane Average Roughness (WRa)

A measurement is carried out using a non-contact type three-dimensional roughness meter trade name [TOPO-3D], manufactured by WYKO Ltd. in conditions comprising 40 measuring magnifications and a measuring area of 242 µm×239 µm (0.058 mm²) to obtain the profile (original data) of the surface roughness. A surface analysis is performed using a software built in the above-described roughness meter to obtain the central plane average roughness (WRa) defined by the following expression.

$$WRa = \sum_{k=1}^{M} \sum_{j=1}^{N} |Z_{jk} - \overline{Z}| / (M \cdot N)$$

Wherein, $$\overline{Z} = \sum_{k=1}^{M} \sum_{j=1}^{N} Z_{jk} / (M \cdot N)$$

(wherein, $Z_{jk}$ is a height on the three-dimensional roughness chart at the number j position and at the number k position in the directions, respectively, when the measuring direction (242 µm) and the direction (239 µm) orthogonal to the measuring direction are divided into M divisions and N divisions, respectively).

(13). Ten Point-average Roughness (WRz)

The ten point-average roughness (WRz) is an average value obtained by measuring the surface of the film with the same measuring meter as that for WRa in the same conditions as those for WRa, subjecting the obtained data to a surface analysis using a software built in the same roughness meter, taking five higher points from the obtained peaks (Hp) and five lower points from the obtained valleys (Hv) and then applying the taken points to the following equation.

$$WRz = \{(Hp1+Hp2+Hp3+Hp4+Hp5) - (Hv1+Hv2+Hv3+Hv4+Hv5)\}/5$$

(14). Young's Modulus

The Young's modulus is obtained by cutting the film into a specimen having a width of 12.7 mm and a length of 300 nm, pulling the obtained specimen with a tensile tester (trade name: [Tensilon], manufactured by Toyo Baldwin Ltd.) in conditions comprising a chuck distance of 100 mm, a temperature of 20° C., a humidity of 50% and a strain rate of 10%/minute, and then applying the rising straight line portion of the obtained tensile stress-strain curve to the following equation.

$$E = \Delta\sigma/\Delta\epsilon$$

Therein, E is Young's modulus; $\Delta\sigma$ is a difference between a value obtained by dividing a stress at one point by an original average sectional area and a value obtained by dividing a stress at another point by the original average sectional area between the two points on a straight line in the rising straight line portion of the tensile stress-strain curve; $\Delta\epsilon$ is a strain difference between the same two points as those for $\Delta\epsilon$.

(15). Content of the Ester Compound in the Laminated Polyester Film (15-1). Case of the poly(ethylene terephthalate (PET)) Film The content of the ester compound in the laminated polyester film is determined by shaving out 30 g of the polyester from the polyester layer B, dissolving the shaven polyester in 0.5 ml of a $CF_3COOD$ (deuterium trifluoroacetic acid):$CDCl_3$ (deuterium chloroform) mixture solvent, subjecting the solution to integrating measurements 1024 times by the use of 600 MNz⁻¹H-NMR, and then substituting a peak integrated value (for example, a peak integrated value detected at a place near to a chemical shift of 2.5 ppm in the case of sorbitan tristearate) originated from the ester compound, when a peak integrated value originated from terephthalic acid units is 100, into the equation of a preliminarily measured calibration curve.

(15-2) Case of the poly(ethylene-2,6-naphthalene dicarboxylate (PEN)) Film

The content of the ester compound in the laminated polyester film is determined by shaving out 30 g of the polyester from the polyester layer B, dissolving the shaven polyester in 0.5 ml of a $CF_3COOD$ (deuterium trifluoroacetic acid): $CDCl_3$ (deuterium chloroform) mixture solvent, subjecting the solution to integrating measurements 1024 times by the use of 600 MNz⁻¹H-NMR, and then substituting a peak integrated value (for example, a peak integrated value detected at a place near to a chemical shift of 2.5 ppm in the case of sorbitan tristearate) originated from the ester compound, when a peak integrated value originated from the aromatic ring protons of 2,6-naphthalenedicarboxylic acid units is 100, into the equation of a preliminarily measured calibration curve.

(16). Winding-Up Property

The evaluation of the winding-up property is carried out by optimizing winding-up conditions on a slitting treatment, slitting 30 rolls in a size of 600 mm width×1200 m length at a speed of 100 m/minute, and then evaluating the surfaces of the slit films according to the following standards, wherein a roll not having grain-like portions, projections and wrinkles is a good roll.

◯: not less than 28 good rolls.
Δ: 25 to 27 good rolls.
×: not more than 24 good rolls.

(17). Production and Characteristics (Electromagnetic Transducing Characteristics) Evaluation of the Magnetic Tape Two 100% cobalt ferromagnetic thin film layers (the thickness of each layer is about 0.1 µm) are formed in a total thickness of 0.2 μm on the surface (the surface of a coating film layer C, when there is the coating film layer C) of the polyester layer A of the laminated polyester film by a vacuum deposition method. A diamond-like carbon (DLC) film and further a fluorine-containing carboxylic acid-based lubricant layer are sequentially disposed on the surface of the formed ferromagnetic thin film. Further, a back coat layer is disposed by coating the surface of the polyester layer B of the laminated polyester film with a coating comprising 100 parts by weight of carbon black, 60 parts by weight of a thermoplastic urethane resin, 18 parts by weight of an isocyanate compound (Colonate L, produced by Nippon Polyurethane Kogyo Co.), 0.5 part by weight of a silicone oil, 250 parts by weight of methyl ethyl ketone and 50 parts by weight of toluene so as to give a thickness of 1 μm, and then drying the applied coating. Subsequently, the film is slit into 8 mm-wide films, and loaded on commercially available 8 mm video cassettes. The characteristics (C/N) of the tapes are measured using the following commercially available equipment.

(a). Used Equipment

A 8 mm video tape recorder (trade name: [EDV-6000], manufactured by Sony Ltd.) and a noise meter (manufactured by Kabushiki Kaisha Sibasoku).

(b). Measurement Method

The characteristics of the tape is measured by recording signals having a recording wavelength of 0.5 μm (frequency: about 7.4 MNz) and then evaluating a relative value, wherein the ratio of the value of the regenerative signal at 6.4 MHz to the value of the regenerative signal at 7.4 MHz is the C/N of the tape; the C/N of a vapor-deposited tape in Comparative example 1 is 0 dB.

○: not less than +2 dB in comparison with Comparative example 1.

Δ: not less than 0 dB to less than +2 dB in comparison with Comparative example 1.

×: less than 0 dB in comparison with Comparative example 1.

(18). Surface Defect Abnormality of the Magnetic Tape on the Production

Two 100% cobalt ferromagnetic thin film layers (the thickness of each layer is about 0.1 μm) are formed in a total thickness of 0.2 μm on the surface (the surface of a coating film layer C, when there is the coating film layer C) of the polyester layer A of the laminated polyester film by a vacuum deposition method.

The surface (10000 cm$^2$) of the cobalt-deposited film is visually checked to evaluate the surface defect abnormality (swell, dent, non-deposited place, or the like) of the film surface due to the inferiority of heat resistance on the cobalt deposition (the evaluation of the heat resistance).

◎: The surface defect abnormality can not be found at any place on a roll after the deposition.

○: The surface defect abnormality is recognized at one to two places on the roll after the deposition.

Δ: The surface defect abnormality is recognized at three to ten places on the roll after the deposition.

×: The surface defect abnormality is recognized at not less than ten places on the roll after the deposition, or one or more holes are recognized.

(19). Foreign Matter Deposition Characteristics

The film is left in an oven set to 150° C. for 30 minutes, and aluminum (Al) is vapor-deposited on the polyester layer B side surface of the film. The surface is observed with a differential interference microscope of 950 magnifications. The number of foreign matters adhered to the surface of the film except projections caused by particles contained in the polyester are counted and then converted into the number per mm$^2$.

◎: Foreign matters are detected on the surface of a roll at a rate of not more than 1000 foreign matters/mm$^2$ after the deposition.

○: Foreign matters are detected on the surface of the roll at a rate of 1001 to 3000 foreign matters/mm$^2$ after the deposition.

Δ: Foreign matters are detected on the surface of the roll at a rate of 3001 to 5000 foreign matters/mm$^2$ after the deposition.

×: Foreign matters are detected on the surface of the roll at a rate of not less than 5001 foreign matters/mm$^2$ after the deposition.

Example 1

A mixture of 100 parts of dimethyl terephthalate with 70 parts of ethylene glycol was mixed with 0.025 part of manganese acetate tetrahydrate as an ester interchange catalyst, and then subjected to the ester interchange reaction, while the inner temperature of the mixture was gradually raised from 150° C. When the ester interchange reaction reached 95%, the reaction solution was mixed with 0.01 part of phosphorous acid as a stabilizer, sufficiently stirred, mixed with a liquid (the content of titanium was 11 percent by weight) obtained by reacting 2.5 parts of ethylene glycol with 0.8 part of trimellitic anhydride and 0.65 part of tetrabutyl titanate, further mixed with 0.03% (based on the polymer) of spherical silica (volume shape factor was 0.5) having an average particle diameter of 60 nm as a lubricant (inactive particles A), sufficiently stirred, transferred into a polymerization reactor, and then subjected to a polycondensation reaction under high temperature and vacuum (the final inner temperature was 295° C.) to obtain the poly(ethylene terephthalate) (resin A1) having an intrinsic viscosity of 0.60 and used for polyester layer A.

On the other hand, an ester interchange reaction was carried out by the same method as described above. When the ester interchange reaction reached 95%, the reaction product was mixed with 0.01 part of phosphorous acid as a stabilizer, sufficiently stirred, and then mixed with 0.03 part of antimony trioxide. After water added to the reaction system was sufficiently distilled away, the reaction product was mixed with 0.05% of silicon particles having an average particle diameter of 300 nm and θ type alumina having an average particle diameter of 100 nm as lubricants (inactive particles B), and then sufficiently stirred. The reaction product was transferred into a polymerization reactor and then polycondensed under high temperature and vacuum (the final inner temperature was 295° C.) to obtain the poly (ethylene terephthalate) having an intrinsic viscosity of 0.60. The content of the antimony left in the polymer was 250 ppm.

The obtained poly(ethylene terephthalate) was preliminarily dried at 150 to 160° C. for 3 hours and then subjected to a solid polymerization at 225° C. for 10 hours under a high vacuum of 0.5 mmHg. The solid-polymerized polymer had an intrinsic viscosity of 0.72, a cyclic trimer content of 0.35 percent by weight and a terminal carboxyl group concentration of 15 eq/10$^6$ g.

99.7% of the obtained solid-polymerized poly(ethylene terephthalate) and 0.15% of the powder of sorbitan tristearate (melting point: 55° C.) as an ester compound were mixed with each other and then kneaded using a twin-screw extruder with a vent to obtain the poly(ethylene terephthalate) (resin B1) having an intrinsic viscosity of 0.70, a cyclic trimer content of 0.40 percent by weight and a terminal carboxyl group concentration of 18 eq/$10^6$ g and used for the polyester layer B.

The obtained resin A1 ant the obtained resin B1 were dried at 170° C. for 3 hours, respectively, fed into two extruders, melted at melting temperatures of 280 to 300° C., highly accurately filtered through steel wire filters having average apertures of 11 μm, coextruded through a multi-manifold type coextrusion die in such a sheet-like shape as to laminate the polyester layer B to one side of the polyester layer A, and quickly cooled to obtain the un-stretched laminated polyester film having a thickness of 89 μm.

The obtained un-stretched laminated polyester film was preliminarily heated, stretched between a low speed roll and a high speed roll at a stretch ratio of 3.3:1 at a film temperature of 100° C., and then quenched to obtain the longitudinally stretched film. Subsequently, in order to form the coating film layer C, a water-based coating (total solid content concentration: 1.0%) having a composition (converted into solid contents) shown as described below was coated on the layer A side of the longitudinally stretched film by a kiss-coat method.

Solid Content Composition of the Coating Liquid

| | |
|---|---|
| Binder: an acryl-modified polyester (IN-170-6, produced by Takamatsu Yushi Ltd.) | 60% |
| Inactive particles C: an acrylic filler (average particle diameter: 30 nm, volume shape factor: 0.40, trade name: Epostar, produced by Nippon Catalyst Ltd.) | 7% |
| Surfactant X: (Nonion NS-208.5, produced by Nippon Yushi Ltd.) | 3% |
| Surfactant Y: (Nonion NS-240, produced by Nippon Yushi Ltd.) | 30% |
| Thickness (after dried) of the layer C: 8 nm | |

The film was then fed to a stenter, and stretched in the transverse direction at a stretch ratio of 4.2:1 at 110° C. The obtained biaxially stretched film was heat-set with hot air of 220° C. for four seconds to obtain the biaxially oriented laminated polyester film having a total thickness of 6.4 μm and a polyester layer B thickness of 1.0 μm. The thickness of the polyester layer A and the thickness of the polyester layer B in the film were adjusted by changing the extrusion rates of the two extruders. The obtained biaxially oriented laminated polyester film had a surface roughness (WRa) of 1.7 nm measured from the surface on the coating film C side, a Young's modulus of 5000 N/mm² in the longitudinal direction and a Young's modulus of 7000 N/mm² in the transverse direction.

The other characteristics of the obtained biaxially oriented laminated polyester film and the characteristics of a ferromagnetic thin film deposition type magnetic tape produced from the biaxially oriented laminated polyester film are shown in Table 1.

Example 2

A mixture of 100 parts of the bis-β-hydroxyethyl ester of terephthalic acid, 65 parts of terephthalic acid and 29 parts of ethylene glycol was subjected to an esterification reaction at temperature of 210 to 230° C. When the distillation amount of water by-produced by the reaction reached 13 parts, the reaction was finished. The reaction product was mixed with a germanium oxide aqueous colloid liquid (1% solution) in an amount of 2.1 parts per 100 parts of the reaction product, transferred to a polymerization reactor, and then polycondensed under high temperature and vacuum (final inner temperature: 290° C.) to obtain the poly(ethylene terephthalate) having an intrinsic viscosity of 0.60. Herein, the content of germanium left in the polymer was 40 ppm.

The obtained poly(ethylene terephthalate) was preliminarily dried at 150 to 160° C. for three hours and then polymerized in the solid state (under a high vacuum of 0.5 mmHg at 225° C. for 12 hours). The solid-polymerized poly(ethylene terephthalate) had an intrinsic viscosity of 0.74, a cyclic trimer content of 0.28 percent by weight, and a terminal carboxyl group concentration of 12 eq/$10^6$ g.

The solid-polymerized poly(ethylene terephthalate) was brought into contact with 90° C. hot water (a weight of 2.5 times the weight of said poly(ethylene terephthalate)) for four hours, subjected to the removal of water, and then dried at 160° C. for four hours in the flow of nitrogen gas to obtain the poly(ethylene terephthalate) (resin B2-1) for the polyester layer B. The obtained resin B2-1 had an intrinsic viscosity of 0.73, a cyclic trimer content of 0.28 percent by weight, and a terminal carboxyl group concentration of 14 eq/$10^6$ g.

On the other hand, a mixture of 100 parts of dimethyl terephthalate with 70 parts of ethylene glycol was mixed with 0.025 part of manganese acetate tetrahydrate as an ester interchange catalyst, and then subjected to the ester interchange reaction, while the inner temperature of the mixture was gradually raised from 150° C. When the ester interchange reaction reached 95%, the reaction solution was mixed with 0.01 part of phosphorous acid as a stabilizer, sufficiently stirred, mixed with 0.02 part of antimony trioxide, mixed with 0.10% (based on the weight of the polymer) of silicone resin particles having an average particle diameter of 300 nm and 0.4% (based on the weight of the polymer) of θ-type alumina having an average particle diameter of 100 nm as lubricants (inactive particles B), sufficiently stirred, transferred to a polymerization reactor, and then subjected to a polycondensation reaction under high temperature and vacuum (final inner temperature: 295° C.) to obtain the poly(ethylene terephthalate) having an intrinsic viscosity of 0.60.

99.7% of the obtained poly(ethylene terephthalate) and 0.30% of sorbitan tristearate (melting point: 55° C.) were mixed with each other and then kneaded using a twin-screw extruder with a vent to obtain the poly(ethylene terephthalate) (resin B2-2) having an intrinsic viscosity of 0.59 and used for the polyester layer B.

Subsequently, a biaxially oriented polyester film was obtained similarly to Example 1, except that a poly(ethylene terephthalate) (resin B2) comprising the obtained resin B2-1 and the obtained resin B2-2 in a mixing ratio of 1:1 was as a polyester for the polyester layer B.

The characteristics of the obtained biaxially oriented laminated polyester film and the characteristics of a ferromagnetic thin film deposition type magnetic tape produced from the biaxially oriented laminated polyester film are shown in Table 1.

Example 3

A poly(ethylene terephthalate) resin (resin A2) for a polyester layer A was produced similarly to the resinA1 for the polyester layer A in Example 1, except that the inactive particles were not added. Further, a poly(ethylene terephthalate) resin (resin B3) for a polyester B was produced similarly to the resin B1 for the polyester layer B in Example 1, except than the kind, average particle diameter and addition amount of the contained inactive particles B were changed as shown in Table 1. A biaxially oriented laminated polyester film was obtained similarly to Example 1, except that the resin A1 and the resin B1 were changed for the resin A2 and the resin B3, respectively.

The characteristics of the obtained biaxially oriented laminated polyester film and the characteristics of a ferromagnetic thin film deposition type magnetic tape produced from the biaxially oriented laminated polyester film are shown in Table 1.

Example 4

A poly(ethylene-2,6-naphthalene dicarboxylate) resin (resinA3) for the polyester layer A was produced similarly to the resin A2 for the polyester layer A in Example 3, except that dimethyl 2,6-naphthalenedicarboxylate was used instead of the dimethyl terephthalate in the same molar amount. Further, a poly(ethylene-2,6-naphthalene dicarboxylate) resin (resin A4) for the polyester layer B was produced similarly to the resin B3 for the polyester layer B in Example 3, except that dimethyl 2,6-naphthalenedicarboxylate was used instead of the dimethyl terephthalate in the same molar amount. Both the resins A3 and B4 had an intrinsic viscosity of 0.60.

The resin A3 and B4 were preliminarily dried at 170 to 180° C. for 5 hours, and then subjected to solid polymerization treatments at 230° C. for 10 hours under a high vacuum of 0.5 mmHg. The solid-polymerized resins had an intrinsic viscosity of 0.72, a cyclic trimer content of 0.35 percent by weight and a terminal carboxyl group concentration of 20 eq/$10^6$ g, respectively.

The solid-polymerized resins A3 and B4 were dried at 170° C. for 6 hours, respectively, and then processed into the un-stretched laminated polyester film having a thickness of 89 μm with the adjustment of the thickness of each layer, similarly to Example 1.

The obtained un-stretched laminated polyester film was preliminarily heated, stretched between a low speed roll and a high speed roll at a stretch ratio of 3.6:1 at a film temperature of 135° C., and then quenched to obtain the longitudinally stretched film. Subsequently, the layer A side of the longitudinally stretched film was coated with a coating liquid for forming a coating film layer, similarly to Example 1. The coating liquid was the same coating liquid as in Example 1, except that the inactive particles C were changed for a core-shell filler (core: cross-linked polystyrene, shell: polymethyl methacrylate, average particle diameter: 30 nm, volume shape factor: 0.45, "SX 8721" produced by JSR Ltd.).

The longitudinally stretched film was then fed to a stenter, and stretched in the transverse direction at a stretch ratio of 5.7:1 at 155° C. The obtained biaxially stretched film was heat-set with hot air of 200° C. for four seconds to obtain the biaxially oriented laminated polyester film having a total thickness of 4.4 μm and a polyester layer B thickness of 0.6 μm. The thickness of the polyester layer A and the thickness of the polyester layer B in this film were adjusted by changing the extrusion rates of the two extruders. The obtained biaxially oriented laminated polyester film had a surface roughness (WRa) of 1.2 nm measured from the surface on the coating film C side, a Young's modulus of 5500 N/mm$^2$ in the longitudinal direction and a Young's modulus of 10,500 N/mm$^2$ in the transverse direction.

The other characteristics of the obtained biaxially oriented laminated polyester film and the characteristics of a ferromagnetic thin film deposition type magnetic tape produced from the biaxially oriented laminated polyester film are shown in Table 1.

TABLE 1

|  |  | Example 1 | Example 2 | Example 3 | Example 4 |
|---|---|---|---|---|---|
| Polyester layer A |  |  |  |  |  |
| Resin |  | PET | PET | PET | PEN |
| Intrinsic viscosity | (cm³/g) | 0.58 | 0.58 | 0.58 | 0.7 |
| DEG content | (wt %) | 1 | 1 | 1 | 1 |
| Germanium element content | (ppm) | 0 | 0 | 0 | 0 |
| Titanium element content | (ppm) | 15 | 15 | 15 | 15 |
| Antimony element content | (ppm) | 0 | 0 | 0 | 0 |
| ΔTcm | (° C.) | 95 | 95 | 98 | 142 |
| Inactive particle A |  |  |  |  |  |
| Kind | (—) | Silica | Silica | Nothing | Nothing |
| Average particle diameter | (nm) | 60 | 60 | — | — |
| Addition amount | (wt %) | 0.03 | 0.03 | — | — |
| WRa | (nm) | 1.7 | 1.7 | 1.1 | 1.2 |
| Polyester layer B |  |  |  |  |  |
| resin | (—) | PET | PET | PET | PEN |
| Intrinsic viscosity | (cm³/g) | 0.68 | 0.64 | 0.68 | 0.7 |
| DEG content | (wt %) | 0.7 | 1.1 | 0.7 | 1 |
| Cyclic trimer content | (wt %) | 0.42 | 0.71 | 0.42 | 0.39 |
| Terminal carboxyl group conentration | (eq/10⁶ g) | 20 | 27 | 20 | 23 |
| Germanium element content | (ppm) | 0 | 20 | 0 | 0 |
| Titanium element content | (ppm) | 0 | 0 | 0 | 0 |
| Antimony element content | (ppm) | 250 | 80 | 250 | 250 |
| Ester compound content | (wt %) | 0.15 | 0.15 | 0.15 | 0.15 |
| Inactive particle B |  |  |  |  |  |
| Kind | (—) | Silicone/alumina | Silica/alumina | Silica | Silica |
| Average particle diameter | (nm) | 300/100 | 300/100 | 200 | 200 |
| Addition amount | (wt %) | 0.05/0.2 | 0.05/0.2 | 0.1 | 0.1 |
| WRz | (nm) | 110 | 110 | 75 | 77 |
| Coating film layer C |  | Present | Present | Present | Present |
| Inactive particle C |  |  |  |  |  |
| Kind | (—) | Acryl | Acryl | Acryl | Core-shell |
| Average particle diameter | (nm) | 30 | 30 | 30 | 30 |
| Addition amount | (wt %) | 7 | 7 | 7 | 7 |
| Characteristics of laminated polyester film |  |  |  |  |  |
| Winding-up property | (—) | ○ | ○ | ○ | ○ |
| Foreign matter deposition characteristics | (—) | ○ | Δ | ○ | ○ |
| Characteristics of magnetic tape |  |  |  |  |  |
| Surface detect abnormality | (—) | ⊚ | ⊚ | ⊚ | ⊚ |
| Electromagnetic transducing characteristics | (—) | ○ | Δ | ○ | ○ |

Example 5

A poly(ethylene terephthalate) resin (resin B5) for a polyester layer B was produced similarly to the resin B1 for the polyester layer B of Example 3, except that the polymerization catalyst was changed from antimony trioxide into 0.012 part of titanium acetate. The obtained resin B5 had an intrinsic viscosity of 0.60 and a titanium residue of 15 ppm. A biaxially oriented laminated polyester film was produced similar to Example 1, except that the resin B1 is changed for the resin B5.

The characteristics of the obtained biaxially oriented laminated polyester film and the characteristics of a ferromagnetic thin film deposition type magnetic tape produced from the biaxially oriented laminated polyester film are shown in Table 2.

Example 6

A biaxially oriented laminated polyester film was obtained similarly to Example 1, except that the longitudinally stretched film for forming the coating film layer C was not coated with the coating liquid in Example 1. The obtained biaxially oriented laminated polyester film had a surface roughness (WRa) of 1.7 nm measured from the surface on the layer A side, a Young's modulus of 5000 N/mm² in the longitudinal direction and a Young's modulus of 7000 N/mm² in the transverse direction.

The other characteristics of the obtained biaxially oriented laminated polyester film and the characteristics of a ferromagnetic thin film deposition type magnetic tape produced from the biaxially oriented laminated polyester film are shown in Table 2.

Example 7

A poly(ethylene terephthalate) resin was produced similarly to the poly(ethylene terephthalate) resin yet not mixed with the powder of the sorbitan tristearate and used for the polyester layer B in Example 1, except that the conditions of the solid polymerization was changed into 5 hours at 225° C. under a high vacuum of 0.5 mmHg. The obtained poly (ethylene terephthalate) resin had an intrinsic viscosity of 0.66, a cyclic trimer content of 0.65 percent by weight, and a terminal carboxyl group concentration of 28 eq/10⁶ g. Similarly to Example 1, the obtained poly(ethylene terephthalate) was mixed with 0.15% of the powder of sorbitan tristearate and then kneaded using a twin-screw extruder with a vent to obtain the poly(ethylene terephthalate) (resin B6) having an intrinsic viscosity of 0.64, a cyclic trimer content of 0.75 percent by weight and a terminal carboxyl of 33 eq/$10^6$ g and used for a polyester layer B. A biaxially oriented laminated polyester film was obtained similarly to Example 1, except that the resin B1 was changed for the resin B6.

The characteristics of the obtained biaxially oriented laminated polyester film and the characteristics of a ferromagnetic thin film deposition type magnetic tape produced from the biaxially oriented laminated polyester film are shown in Table 2.

Example 8

A poly(ethylene terephthalate) resin was produced similarly to the poly(ethylene terephthalate) resin yet not mixed with the powder of the sorbitan tristearate and used for the polyester layer B in Example 1, except that the conditions of the solid phase polymerization were changed into 5 hours at 225° C. under a high vacuum of 0.5 mmHg. The obtained poly(ethylene terephthalate) resin had an intrinsic viscosity of 0.80, a cyclic trimer content of 0.20 percent by weight, and a terminal carboxyl group concentration of 9 eq/$10^6$ g. Similarly to Example 1, the obtained poly(ethylene terephthalate) resin was mixed with 0.15% of the powder of the sorbitan tristearate, kneaded using a twin-screw extruder with a vent to obtain the poly(ethylene terephthalate) resin (resin B7) having an intrinsic viscosity of 0.77, a cyclic trimer content of 0.25 percent by weight, and a terminal carboxyl group concentration of 12 eq/$10^6$ g and used for a polyester layer B. Subsequently, a biaxially oriented polyester film was obtained similarly to Example 1, except that the resin B1 was charged for the resin B7.

The characteristics of the obtained biaxially oriented laminated polyester film and the characteristics of a ferromagnetic thin film deposition type magnetic tape produced from the biaxially oriented laminated polyester film are shown in Table 2.

Example 9

A poly(ethylene terephthalate) resin (resin B8) having an intrinsic viscosity of 0.70, a cyclic trimer content of 0.40 percent by weight, and a terminal carboxyl group concentration of 18 eq/$10^6$ g and used for a polyester layer B was produced similarly to the resin BI in Example 1, except that the sorbitan tristearate was not kneaded. A biaxially oriented laminated polyester film was obtained similarly to Example 1, except that the resin B1 was changed for the resin B8.

The characteristics of the obtained biaxially oriented laminated polyester film and the characteristics of a ferromagnetic thin film deposition type magnetic tape produced from the biaxially oriented laminated polyester film are shown in Table 2.

TABLE 2

|  |  | Example 5 | Example 6 | Example 7 | Example 8 | Example 9 |
|---|---|---|---|---|---|---|
| Polyester layer A |  |  |  |  |  |  |
| Resin |  | PET | PET | PET | PET | PET |
| Intrinsic viscosity | (cm$^3$/g) | 0.58 | 0.58 | 0.58 | 0.58 | 0.58 |
| DEG content | (wt %) | 1 | 1 | 1 | 1 | 1 |
| Germanium element content | (ppm) | 0 | 0 | 0 | 0 | 0 |
| Titanium element content | (ppm) | 15 | 15 | 15 | 15 | 15 |
| Antimony element content | (ppm) | 0 | 0 | 0 | 0 | 0 |
| ΔTcm | (° C.) | 95 | 95 | 95 | 95 | 95 |
| Inactive particle A |  |  |  |  |  |  |
| Kind | (—) | Silica | Silica | Silica | Silica | Silica |
| Average particle diameter | (nm) | 60 | 60 | 60 | 60 | 60 |
| Addition amount | (wt %) | 0.03 | 0.03 | 0.03 | 0.03 | 0.03 |
| WRa | (nm) | 1.7 | 1.7 | 1.7 | 1.7 | 1.7 |
| Polyester layer B |  |  |  |  |  |  |
| resin | (—) | PET | PET | PET | PET | PET |
| Intrinsic viscosity | (cm$^3$/g) | 0.68 | 0.68 | 0.62 | 0.75 | 0.68 |
| DEG content | (wt %) | 1 | 0.7 | 0.7 | 0.7 | 0.7 |
| Cyclic trimer content | (wt %) | 0.42 | 0.42 | 0.78 | 0.32 | 0.42 |
| Terminal carboxyl group concentration | (eq/$10^6$ g) | 20 | 20 | 35 | 15 | 20 |
| Germanium element content | (ppm) | 0 | 0 | 0 | 0 | 0 |
| Titanium element content | (ppm) | 15 | 0 | 0 | 0 | 0 |
| Antimony element content | (ppm) | 0 | 250 | 250 | 250 | 250 |
| Ester compound content | (wt %) | 0.15 | 0.15 | 0.15 | 0.15 | — |
| Inactive particle B |  |  |  |  |  |  |
| Kind | (—) | Silicone/alumina | Silicone/alumina | Silicone/alumina | Silicone/alumina | Silicone/alumina |
| Average particle diameter | (nm) | 300/100 | 300/100 | 300/100 | 300/100 | 300/100 |
| Addition amount | (wt %) | 0.05/0.2 | 0.05/0.2 | 0.05/0.2 | 0.05/0.2 | 0.05/0.2 |
| WRz | (nm) | 110 | 110 | 110 | 110 | 110 |
| Coating film layer C |  | Present | Absent | Present | Present | Present |
| Inactive particle C |  |  |  |  |  |  |
| Kind | (—) | Acryl | — | Acryl | Acryl | Acryl |
| Average particle diameter | (nm) | 30 | — | 30 | 30 | 30 |
| Addition amount | (wt %) | 7 | a— | 7 | 7 | 7 |
| Characteristics of laminated polyester film |  |  |  |  |  |  |

TABLE 2-continued

|  |  | Example 5 | Example 6 | Example 7 | Example 8 | Example 9 |
|---|---|---|---|---|---|---|
| Winding-up property | (–) | ○ | ○ | ○ | ○ | Δ |
| Foreign matter deposition characteri | (–) | ○ | ○ | Δ | ◎ | ○ |
| Characteristics of magnetic tape |  |  |  |  |  |  |
| Surface detect abnormality | (–) | ◎ | ○ | ○ | ◎ | ○ |
| Electromagnetic transducing charact | (–) | ○ | Δ | Δ | ○ | Δ |

Comparative Example

A poly(ethylene terephthalate) resin (resin B9) having a cyclic trimer content of 1.05 percent by weight and used for a polyester layer B was obtained similarly to the resin B1 of Example 1, except that the solid phase polymerization was not carried out. Subsequently, a biaxially oriented laminated polyester film was obtained similarly to Example 1, except that the resin B1 was changed for the resin B9. The obtained biaxially oriented laminated polyester film could not give sufficient electromagnetic transducing characteristics, when processed into a magnetic tape, because oligomers bled out from the polyester layer B on the travel of the biaxially oriented laminated polyester film were largely transferred to the opposite side of the biaxially oriented laminated polyester film.

The characteristics of the obtained biaxially oriented laminated polyester film and the characteristics of a ferromagnetic thin film deposition type magnetic tape produced from the biaxially oriented laminated polyester film are shown in Table 3.

Comparative Examples 2 and 3

A poly(ethylene terephthalate) resin (resin B10 or resin B11) for a polyester layer B was produced similarly to the resin BI for the polyester layer B in Example 1, except that the kind, average particle diameter and addition amount of the contained inactive particles B were changed as shown in Table 3. Subsequently, a biaxially oriented laminated polyester film was obtained similarly to Example 1, except that the resin BI was changed for the resin B10 or the resin B11. In the case of Comparative Example 2, the obtained biaxially oriented laminated polyester film could not give sufficient electromagnetic transducing characteristics, when processed into a magnetic tape, because the shapes of surface projections on the polyester layer B side were transferred to the surface of the coating film layer C on the opposite side of the biaxially oriented laminated polyester film. In the case of Comparative Example 3, the obtained biaxially oriented laminated polyester film did not have a good winding-up property, because the surface of the polyester layer B is too flat.

The characteristics of the obtained biaxially oriented laminated polyester film and the characteristics of a ferromagnetic thin film deposition type magnetic tape produced from the biaxially oriented laminated polyester film are shown in Table 3.

Comparative Example 4

A poly(ethylene terephthalate) resin was produced similarly to the poly(ethylene terephthalate) resin yet not mixed with the powder of sorbitan tristearate and used for the polyester layer B in Example 1, except that the conditions of the solid phase polymerization were changed into 4 hours at 230° C. under a high vacuum of 0.5 mmHg. The obtained poly(ethylene terephthalate) resin had an intrinsic viscosity of 0.65, a cyclic trimer content of 0.78 percent by weight, and a terminal carboxyl group concentration of 33 eq/$10^6$ g. Similarly to Example 1, the poly(ethylene terephthalate) resin was mixed with 0.15% of the powder of sorbitan tristearate, and then kneaded using a twin-screw extruder with a vent to obtain the poly(ethylene terephthalate) resin (resin B12) having an intrinsic viscosity of 0.63, a cyclic trimer content of 0.83 percent by weight, and a terminal carboxyl group concentration of 36 eq/$10^6$ g. A biaxially oriented laminated polyester film was obtained similarly to Example 1, except that the resin BI was changed for the resin B12.

The characteristics of the obtained biaxially oriented laminated polyester film and the characteristics of a ferromagnetic thin film deposition type magnetic tape produced from the biaxially oriented laminated polyester film are shown in Table 3.

TABLE 3

|  |  | Comparative Example 1 | Comparative Example 2 | Comparative Example 3 | Comparative Example 4 |
|---|---|---|---|---|---|
| Polyester layer A |  |  |  |  |  |
| Resin |  | PET | PET | PET | PET |
| Intrinsic viscosity | (cm³/g) | 0.58 | 0.58 | 0.58 | 0.58 |
| DEG content | (wt %) | 1 | 1 | 1 | 1 |
| Germanium element content | (ppm) | 0 | 0 | 0 | 0 |
| Titanium element content | (ppm) | 15 | 15 | 15 | 15 |
| Antimony element content | (ppm) | 0 | 0 | 0 | 0 |
| ΔTcm | (° C.) | 95 | 95 | 95 | 95 |
| Inactive particle A |  |  |  |  |  |
| Kind | (–) | Silica | Silica | Silica | Silica |
| Average particle diameter | (nm) | 60 | 60 | 60 | 60 |

TABLE 3-continued

|  |  | Comparative Example 1 | Comparative Example 2 | Comparative Example 3 | Comparative Example 4 |
|---|---|---|---|---|---|
| Addition amount | (wt %) | 0.03 | 0.03 | 0.03 | 0.03 |
| WRa | (nm) | 1.7 | 1.7 | 1.7 | 1.7 |
| Polyester layer B |  |  |  |  |  |
| resin | (—) | PEN | PET | PET | PEN |
| Intrinsic viscosity | (cm³/g) | 0.68 | 0.68 | 0.68 | 0.61 |
| DEG content | (wt %) | 0.7 | 0.7 | 0.7 | 0.7 |
| Cyclic trimer content | (wt %) | 1.05 | 0.42 | 0.42 | 0.88 |
| Terminal carboxyl group conentration | (eq/10⁶ g) | 38 | 20 | 20 | 38 |
| Germanium element content | (ppm) | 0 | 0 | 0 | 0 |
| Titanium element content | (ppm) | 0 | 0 | 0 | 0 |
| Antimony element content | (ppm) | 250 | 250 | 250 | 250 |
| Ester compound content | (wt %) | 0.15 | 0.15 | 0.15 | 0.15 |
| Inactive particle B |  |  |  |  |  |
| Kind | (—) | Silicone/alumina | Siliocne/alumina | Silica | Silicone/alumina |
| Average particle diameter | (nm) | 300/100 | 1100/100 | 500 | 300/100 |
| Addition amount | (wt %) | 0.05/0.2 | 0.05/0.02 | 0.0005 | 0.05/0.02 |
| WRz | (nm) | 110 | 220 | 30 | 110 |
| Coating film layer C |  | Present | Present | Present | Present |
| Inactive particle C |  |  |  |  |  |
| Kind | (—) | Acryl | Acryl | Acryl | Acryl |
| Average particle diameter | (nm) | 30 | 30 | 30 | 30 |
| Addition amount | (wt %) | 7 | 7 | 7 | 7 |
| Characteristics of laminated polyester film |  |  |  |  |  |
| Winding-up property | (—) | ○ | ○ | X | ○ |
| Foreign matter deposition characteristics | (—) | X | ○ | ○ | X |
| Characteristics of magnetic tape |  |  |  |  |  |
| Surface detect abnormality | (—) | Δ | Δ | X | Δ |
| Electromagnetic transducing characteristics | (—) | X | X | X | X |

As clearly shown in Tables 1, 2 and 3, the laminated polyester film of the present invention has a highly flat one side, is little in the transfer of oligomers from the opposite side, exhibits excellent electromagnetic transducing characteristics, and has a highly good winding-up property. On the other hand, a laminated polyester film not satisfying the requirements of the present invention can simultaneously not satisfy these characteristics.

The invention claimed is:

1. A laminated polyester film comprising a polyester layer A and a polyester layer B laminated to one side of the polyester layer A, wherein the polyester layer B contains a cyclic trimer in an amount of not more than 0.8 percent by weight based on the weight of the polyester layer B, has a terminal carboxyl group concentration of not more than 35 eq/10⁶ g in the polyester for forming the polyester layer B, and contains inactive particles B having an average particle diameter of 50 to 1000 nm in an amount of 0.001 to 1 percent by weight based on the weight of the polyester layer B and;

wherein the polyester layer A does not contain inactive particles or contains inactive particles A having a smaller average particle diameter than the average particle diameter of the inactive particles B;

wherein the surface roughness (WRaA) of the surface of the polyester layer A not in contact with the polyester layer B ranges from 0.1 to 4 nm;

wherein the intrinsic viscosity of the polyester for forming the polyester layer B is not less than 0.55 dl/g, and not more than 1.0 dl/g;

wherein the ten point-average roughness (WRzB) of the surface of the polyester layer B not in contact with the polyester layer A ranges from 30 to 300 nm;

wherein the polyester layer A contains diethylene glycol in an amount of 0.1 to 2.5% by weight based on the weight of the polyester layer A; and wherein the crystallization parameter (ΔTcm) of the polyester for forming the polyester layer A ranges from 70 to 180° C.

2. The laminated polyester film according to claim 1, wherein the polyester layer B contains diethylene glycol in an amount of 0.3 to 3.0 percent by weight based on the weight of the polyester layer B.

3. The laminated polyester film according to claim 1, wherein the polyester layer B contains germanium element (Ge) in an amount of 1 to 50 ppm based on the weight of the polyester layer B.

4. The laminated polyester film according to claim 1, wherein the polyester layer B contains antimony element (Sb) in an amount of 10 to 350 ppm based on the weight of the polyester layer B.

5. The laminated polyester film according to claim 1, wherein the polyester layer B contains titanium element (Ti) in an amount of 3 to 25 ppm based on the weight of the polyester layer B.

6. The laminated polyester film according to claim 1, wherein the polyester layer B contains an ester compound comprising an aliphatic monocarboxylic acid having eight or more carbon atoms and a polyhydric alcohol.

7. The laminated polyester film according to claim 1, wherein the polyester layer A contains antimony element (Sb) in an amount of 10 to 250 ppm based on the weight of the polyester layer A.

8. The laminated polyester film according to claim 1, wherein the polyester layer A contains titanium element (Ti) in an amount of 3 to 25 ppm based on the weight of the polyester layer A.

9. The laminated polyester film according to claim 1, wherein the polyester layer A contains germanium element (Ge) in an amount of not more than 10 ppm based on the weight of the polyester layer A.

10. The laminated polyester film according to claim 1, wherein the polyester layer A does substantially not contain inactive particles.

11. The laminated polyester film according to claim 1, wherein the polyester layer A contains inactive particles having an average particle diameter of 30 to 400 nm in an amount of 0.001 to 0.2 percent by weight based on the weight of the polyester layer A.

12. The laminated polyester film according to claim 1, wherein the polyester for forming the polyester layer A or the polyester layer B is poly(ethylene terephthalate).

13. The laminated polyester film according to claim 1, wherein the polyester for forming the layer A or the polyester layer B is poly(ethylene-2,6-naphthalene dicarboxylate).

14. The laminated polyester film according to claim 1, wherein the thickness of the film ranges from 2 to 8 μm.

15. The laminated polyester film according claim 1, wherein the thickness of the polyester layer B / the thickness of the laminated polyester film ranges from 1/50 to 1/2.

16. A magnetic recording medium comprising the laminated polyester film according to claim 1 and a magnetic layer on the surface of the polyester layer A of said laminated polyester film.

17. A laminated polyester film comprising a polyester layer A and a polyester layer B laminated to one side of the polyester layer A, wherein the polyester layer B contains a cyclic trimer in an amount of not more than 0.8 percent by weight based on the weight of the polyester layer B, has a terminal carboxyl group concentration of not more than 35 eq/10$^6$ g in the polyester for forming the polyester layer B, and contains inactive particles B having an average particle diameter of 50 to 1000 nm in an amount of 0.001 to 1 percent by weight based on the weight of the polyester layer B and wherein the polyester layer A does not contain inactive particles or contains inactive particles A having a smaller average particle diameter than the average particle diameter of the inactive particles B, and
    wherein a coating film layer C comprising inactive particles C and a binder resin is laminated to the polyester layer B-non-contacted surface of the polyester layer A;
    wherein the intrinsic viscosity of the polyester for forming the polyester layer B is not less than 0.55 dl/g and not more than 1.0 dl/g;
    wherein the ten point-average roughness (WRzB) of the surface of the polyester layer B not in contact with the polyester layer A ranges from 30 to 300 nm;
    wherein the polyester layer A contains diethylene glycol in an amount of 0.1 to 2.5% by weight based on the weight of the polyester layer A; and
    wherein the crystallization parameter (ΔTcm) of the polyester for forming the polyester layer A ranges from 70 to 180° C.

18. The laminated polyester film according to claim 17, wherein the coating film layer C contains the inactive particles C in an amount of 0.5 to 30 percent by weight based on the weight of the coating film layer C.

19. The laminated polyester film according to claim 17, wherein the average particle diameter of the inactive particles C ranges from 10 nm to 50 nm.

20. The laminated polyester film according to claim 17, wherein the volume shape factor of the inactive particles C ranges from 0.1 to π/6.

21. The laminated polyester film according to claim 17, wherein the surface roughness WRaC of the side of the coating film layer C not in contact with the polyester layer A ranges from 0.1 to 4 nm.

22. The laminated polyester film according to claim 17, wherein the thickness of the coating film C ranges from 1 to 100 nm.

23. A magnetic recording medium comprising the laminated polyester film according to either claim 1 or claim 17 as a base film of a magnetic recording medium.

24. The magnetic recording medium of claim 23 which is a ferromagnetic metal thin film type magnetic recording medium.

25. A magnetic recording medium comprising the laminated polyester film according to claim 17 and a magnetic layer on the surface of the coating film layer C of said laminated polyester film.

26. The magnetic recording medium according to either claim 16 or 25, wherein the magnetic layer is a ferromagnetic metal thin film.

* * * * *